United States Patent
Shimada et al.

(10) Patent No.: US 8,474,789 B2
(45) Date of Patent: Jul. 2, 2013

(54) VALVE CONTROL APPARATUS

(75) Inventors: Hiroki Shimada, Anjo (JP); Tetsuji Yamanaka, Obu (JP); Tetsuma Takeda, Kariya (JP); Akitoshi Mizutani, Okazaki (JP); Koichiro Matsumoto, Kyoto (JP); Yoshiyuki Kono, Obu (JP)

(73) Assignee: Denso Corporation, Kariya (JP)

( * ) Notice: Subject to any disclaimer, the term of this patent is extended or adjusted under 35 U.S.C. 154(b) by 232 days.

(21) Appl. No.: 13/173,401

(22) Filed: Jun. 30, 2011

(65) Prior Publication Data
US 2012/0001104 A1    Jan. 5, 2012

(30) Foreign Application Priority Data

Jun. 30, 2010 (JP) ................................. 2010-148796
Dec. 1, 2010 (JP) ................................. 2010-268265

(51) Int. Cl.
*F16K 31/02* (2006.01)
(52) U.S. Cl.
USPC ................ 251/129.04; 251/129.13; 251/229; 251/231; 251/279; 137/554
(58) Field of Classification Search
USPC .................. 251/58, 129.04, 129.11–129.13, 251/129.2, 229, 231, 279, 280; 137/554
See application file for complete search history.

(56) References Cited

U.S. PATENT DOCUMENTS

| 1,961,386 | A | * | 6/1934 | Payne | 137/554 |
| 2,908,478 | A | * | 10/1959 | Starrett | 251/279 |
| 3,254,660 | A | * | 6/1966 | Ray | 137/553 |
| 3,828,808 | A | * | 8/1974 | Ortelli | 251/229 |
| 3,985,151 | A | * | 10/1976 | Smith | 137/269 |
| 4,050,670 | A | * | 9/1977 | Borg et al. | 251/229 |
| 4,527,769 | A | * | 7/1985 | Stogner et al. | 251/229 |
| 4,549,470 | A | * | 10/1985 | Yogo | 92/167 |
| 4,918,924 | A | * | 4/1990 | Kyoya et al. | 92/167 |
| 4,971,288 | A | * | 11/1990 | Tanner et al. | 251/58 |
| 5,797,585 | A | * | 8/1998 | Auvity | 251/279 |
| 6,199,822 | B1 | * | 3/2001 | Hakansson | 251/58 |
| 7,161,349 | B2 | * | 1/2007 | Itoh et al. | 324/207.25 |
| 2010/0319663 | A1 | | 12/2010 | Gracner et al. | |

FOREIGN PATENT DOCUMENTS

| JP | 10-103069 | 4/1998 |
| JP | 2004-177398 | 6/2004 |
| JP | 2010-90766 | 4/2010 |

OTHER PUBLICATIONS

Takeda et al, U.S. Appl. No. 13/171,910, filed Jun. 29, 2011.
Chinese Office Action (5 pages) dated Dec. 5, 2012, issued in corresponding Chinese Application No. 201110185838.9 with English translation (4 pages).

* cited by examiner

*Primary Examiner* — Eric Keasel
(74) *Attorney, Agent, or Firm* — Nixon & Vanderhye PC

(57) ABSTRACT

A magnetic sensing surface of a stroke sensor is placed in an angular range between a first imaginary line and a second imaginary line. The first imaginary line is an imaginary line that coincides with a center line between first and second magnets of a magnetic movable body when a wastegate valve is placed to have a full close degree of the wastegate valve. The second imaginary line is an imaginary line that coincides with the center line between the first and second magnets when the wastegate valve is placed to have a half degree between the full close degree and a full open degree of the wastegate valve.

20 Claims, 19 Drawing Sheets

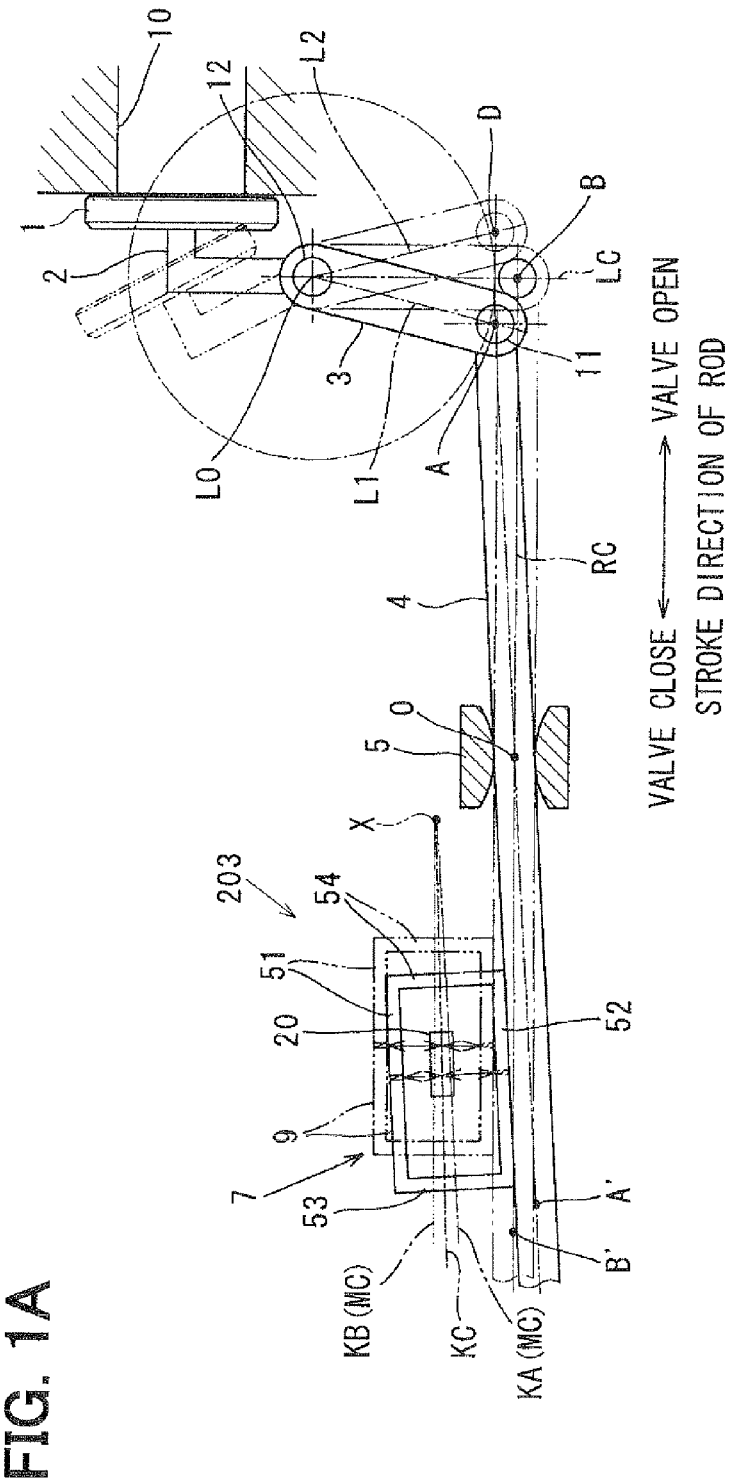
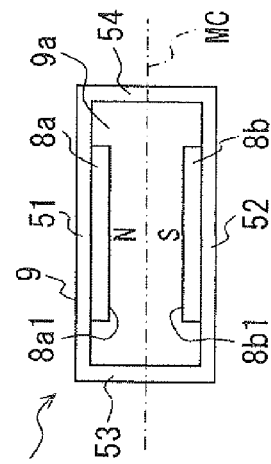

LINEARITY : 1.5%

LINEARITY : 2.4%

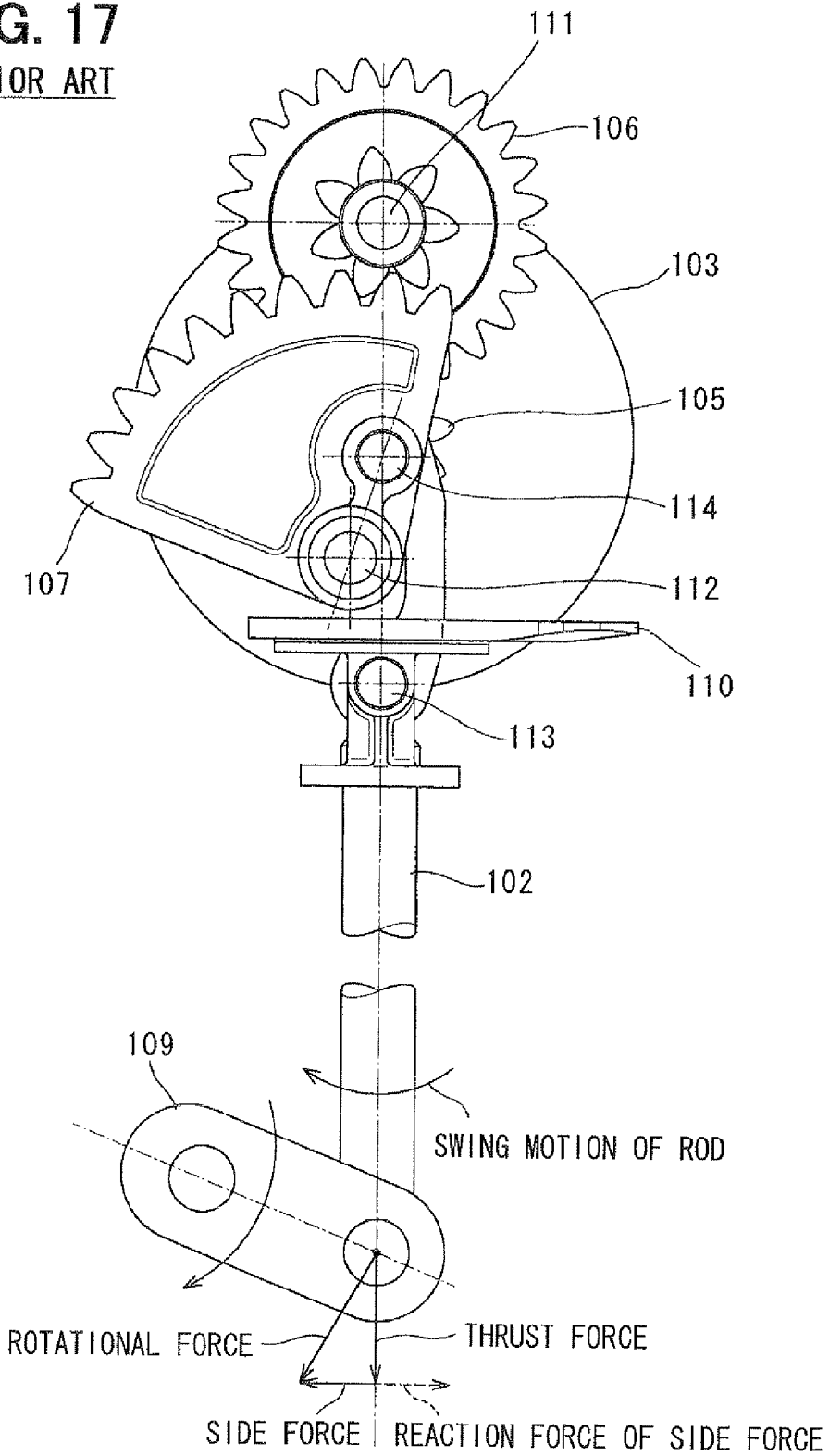

VALVE CONTROL APPARATUS

CROSS REFERENCE TO RELATED APPLICATION

This application is based on and incorporates herein by reference Japanese Patent Application No. 2010-148796 filed on Jun. 30, 2010 and Japanese Patent Application No. 2010-268265 filed on Dec. 1, 2010.

BACKGROUND OF THE INVENTION

1. Field of the Invention

The present invention relates to a valve control apparatus.

2. Description of Related Art

For instance, PCT publication WO2009/062928A1 (corresponding to U.S. 2010/0319663A1) teaches a valve control apparatus, which controls opening and closing of a valve. Specifically, with reference to FIGS. 17 and 18, the valve control apparatus includes a valve 101, an electric actuator and a motor control unit. The valve 101 is adapted to open and close a fluid passage. The electric actuator includes a rod 102, which drives the valve 101. The motor control unit controls electric power supplied to an electric motor 103, which is a drive power source of the electric actuator.

The electric actuator includes a speed reducing mechanism, a reciprocating slider link mechanism 300 and a thrust bearing 104. The speed reducing mechanism reduces a speed of rotation transmitted from the electric motor 103 through two stages. The reciprocating slider link mechanism converts rotational motion of the speed reducing mechanism into linear motion of the rod 102. The thrust bearing 104 slidably supports the rod 102 to enable reciprocation of the rod 102 in a reciprocating direction. The thrust bearing 104 includes a through-hole, which extends through the thrust bearing 104 in an axial direction of the rod 102, and the thrust bearing 104 is securely held in a bearing hole of an actuator case.

The speed reducing mechanism includes a pinion gear 105, an intermediate gear 106 and a final gear 107. The pinion gear 105 is fixed to an output shaft of the electric motor 103. The intermediate gear 106 is meshed with and is driven by the pinion gear 105. The final gear 107 is meshed with and is driven by the intermediate gear 106. The intermediate gear 106 is rotatably installed to an outer peripheral surface of a support shaft 111. The final gear 107 is rotatably installed to an outer peripheral surface of a support shaft 112.

A toggle lever 108 is connected to the rod 102 of the electric actuator through a first pivot 113. The toggle lever 108 is connected to the final gear 107 through a second pivot 114. The first pivot 113 is fitted into a first fitting hole of the toggle lever 108 and is thereby fixed to the toggle lever 108. The second pivot 114 is fitted into a second fitting hole of the toggle lever 108 and is thereby fixed to the toggle lever 108.

In the electric actuator of PCT publication WO2009/062928A1 (corresponding to US 2010/0319663A1), the electric motor 103 drives the gears 105-107 of the speed reducing mechanism, and the toggle lever 108, which is connected to the final gear 107 through the second pivot 114, pushes (or pulls) the rod 102 in an axial direction thereof to convert the rotational motion of the final gear 107 into the reciprocating linear motion of the rod 102.

Here, a link lever 109 is placed between the rod 102 and the shaft 115 of the valve 101.

In the electric actuator of PCT publication WO2009/062928A1 (corresponding to US 2010/0319663A1), when the link lever 109 is rotated by the rod thrust force, the rod 102 receives a reaction force of a side force (indicated by a dotted line in FIG. 17) from the link lever 109, so that swing motion is generated at a distal end part of the rod 102.

At the time of driving the rod 102, the rod 102 is driven to have linear motion in the rod axial direction Y and also curved motion in a curved direction Y'. Furthermore, a positional deviation occurs in a stroke position of the rod 102 due to a valve pressure P.

The sensor senses a location of a magnetic circuit (a magnetic circuit including a magnet and a yoke), which is provided in a rod position sensing member 110. Therefore, when the rod 102 is moved curvedly, the magnetic field from the magnet changes in a curved manner, and thereby an output value of the sensor changes in a curved manner. Thereby, a linearity of the output change characteristic of the sensor relative to the stroke position of the magnetic circuit, i.e., the stroke position of the rod 102 is deteriorated.

Furthermore, Japanese Unexamined Patent Publication No. 2004-177398A teachers a rod stroke position sensing apparatus, which can directly sense a linear stroke position of the rod 102. Specifically, as shown in FIG. 19A, the rod stroke sensing device includes a magnetic stationary body (two stators 121, 122 and a sensor held therebetween) and a magnetic circuit (a magnetic circuit having a permanent magnet 123 and a yoke 124). The magnetic circuit is displaceable relative to the magnetic stationary body in the stroke direction of the rod 102. The magnetic stationary body is placed parallel to the stroke direction (the axial direction) of the rod 102.

The sensor includes a Hall element 125, which is inserted into a magnetic flux sensing gap formed between the two stators 121, 122. The magnetic circuit is provided integrally to the rod 102.

The stators 121, 122, the permanent magnet 123, the yoke 124 and the Hall element 125 of the rod stroke position sensing apparatus form two magnetic circuits A, B.

In the rod stroke position sensing apparatus of Japanese Unexamined Patent Publication No. 2004-177398A, the magnetic circuits A, B are swung as indicated by arrows due to looseness of a rod bearing 133, which slidably supports the rod 102 to enable reciprocation of the rod 102 in the reciprocating direction. Thereby, a distance between the magnetic circuit and the Hall element 125 changes, so that the strength of the magnetic field, which is received by a magnetic sensing surface of the Hall element 125, varies (fluctuates).

Here, in a case where the magnetic circuit (the permanent magnet 123, the yoke 124) is placed close to the rod bearing 133, as shown in FIG. 19B, the amplitude of the swing of the magnetic circuit is small, and thereby a fluctuating range of the distance between the magnetic circuit and the Hall element 125 is also small. In contrast, in a case where the magnetic circuit is placed distant from the rod bearing 133, the amplitude of swing of the magnetic circuit becomes large, and the fluctuating range of the distance between the magnetic circuit and the Hall element 125 becomes large.

That is, the magnetic sensing surface of the Hall element 125 relative to the magnetic circuit is not placed in an average position of the amplitude of the magnetic circuit, so that there is a large difference in the amplitude of the swing of the magnetic circuit between the one case, in which the magnetic circuit is placed close to the rod bearing 133, and the other case, in which the magnetic circuit is placed distant from the rod bearing 133. Therefore, there is the fluctuation difference in the strength of the magnetic field, which is received by the magnetic sensing surface of the Hall element 125. As a result, there is the large difference in the sensor output in response to the swing of the rod 102, and thereby the sensor accuracy is deteriorated.

SUMMARY OF THE INVENTION

The present invention addresses the above disadvantages. According to the present invention, there is provided a valve control apparatus, which includes a valve, an actuator with a rod, a link mechanism, a magnetic movable body, a sensor, and means (hereinafter referred to as sensing means) for sensing an amount of displacement of the rod. The valve is adapted to rotate about a rotational axis of the valve. The actuator drives the rod to reciprocate the rod in an axial direction of the rod and thereby to drive the valve. The link mechanism includes a lever, which connects between the valve and the rod and converts linear motion of the rod into rotational motion of the valve. The magnetic movable body is installed integrally to the rod and includes first and second magnets, which cooperate with each other to generate a magnetic field having a generally constant density of a magnetic flux. A central axis of the rod is generally parallel to a center line of the first and second magnets, which is generally parallel to and is centered between a magnetic pole surface of the first magnet and a magnetic pole surface of the second magnet that are opposed to each other. The sensor outputs an electric signal, which corresponds to the magnetic flux that changes in response to movement of the magnetic movable body relative to the sensor. The sensing means is for sensing the amount of displacement of the rod in a stroke direction, which coincides with the axial direction of the rod, based on the electric signal outputted from the sensor. The actuator is driven to control opening and closing of the valve based on the amount of displacement of the rod in the stroke direction of the rod sensed with the sensing means. The actuator includes a rod bearing, which slidably supports the rod to enable slide motion of the rod in the stroke direction while enabling swing motion of the rod about the rod bearing. The sensor includes a magnetic sensing surface, which is adapted to sense the magnetic flux of the magnetic movable body. The lever includes a rotational axis, which is coaxial with the rotational axis of the valve, at a valve-side connection of the lever that is rotatably connected to the valve. The lever includes a rod-side connection that is rotatably connected to the rod. The rod-side connection is adapted to move along a rotational moving path, which is a curved path centered at the rotational axis of the valve-side connection of the lever and has a predetermined radius of curvature, when the valve is rotated through the rod. When an opening degree of the valve becomes a full close degree to fully close the flow passage, a rotational moving point of the rod-side connection, which is moved along the rotational moving path, is placed in a full close point along the rotational moving path. When the opening degree of the valve becomes a full open degree to fully open the flow passage, the rotational moving point of the rod-side connection, which moves along the rotational moving path, is placed in a full open point along the rotational moving path. When the opening degree of the valve becomes a half degree, which is one half of an angular degree between the full close degree and the full open degree, the rotational moving point of the rod-side connection is placed in a half point between the full close point and the full open point along the rotational moving path. At least a portion of the magnetic sensing surface of the sensor is placed in an angular range between a first imaginary line and a second imaginary line. The first imaginary line coincides with the center line of the first and second magnets when the rotational moving point of the rod-side connection of the lever is placed in the full close point. The second imaginary line coincides with the center line of the first and second magnets when the rotational moving point of the rod-side connection of the lever is placed in the half point.

BRIEF DESCRIPTION OF THE DRAWINGS

The invention, together with additional objectives, features and advantages thereof, will be best understood from the following description, the appended claims and the accompanying drawings in which:

FIG. 1A is a descriptive view showing a relationship between a rod of an electric actuator and a link lever of a wastegate valve control apparatus according to a first embodiment of the present invention;

FIG. 1B is a schematic view showing a magnetic movable body of the wastegate valve control apparatus of FIG. 1A;

FIG. 17 is a descriptive view showing a relationship between a rod of an electric actuator and a link lever according to a first prior art;

DETAILED DESCRIPTION OF THE INVENTION

First Embodiment

Figure 2:
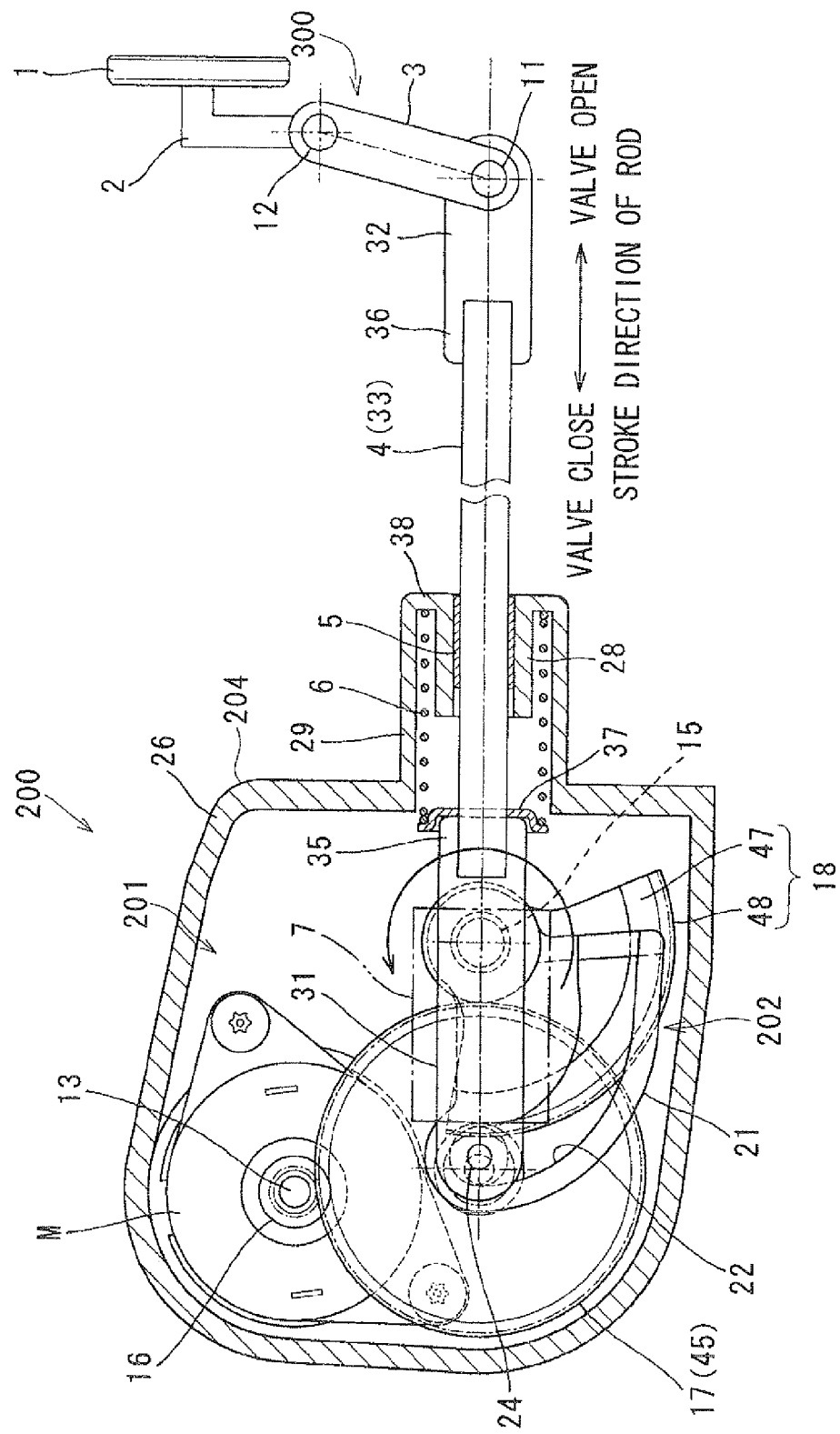
FIG. 2 is a descriptive view showing the wastegate valve control apparatus according to the first embodiment.
Figure 3:
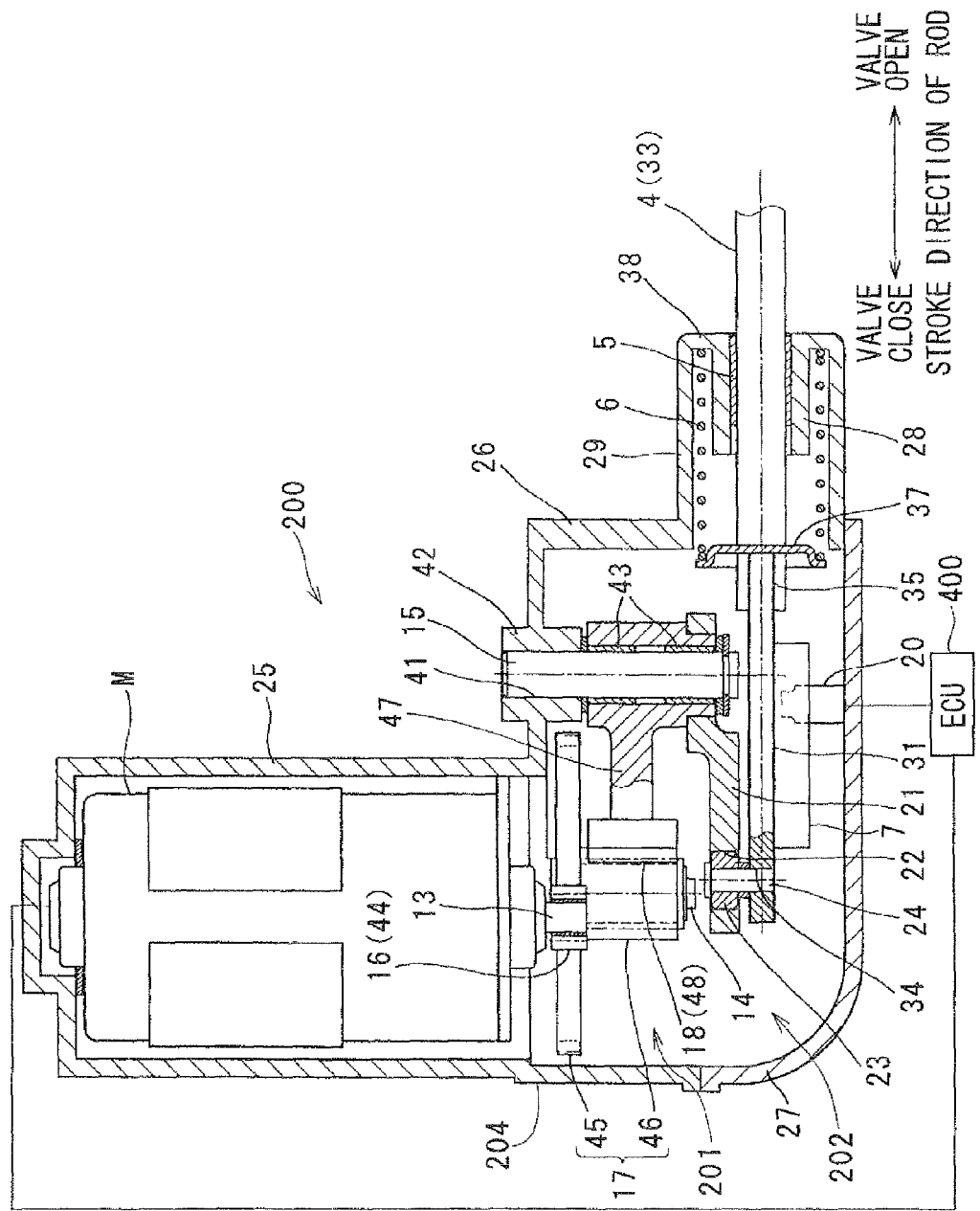
FIG. 3 is a cross-sectional view showing a valve full close state of an electric actuator according to the first embodiment.
Figure 4:
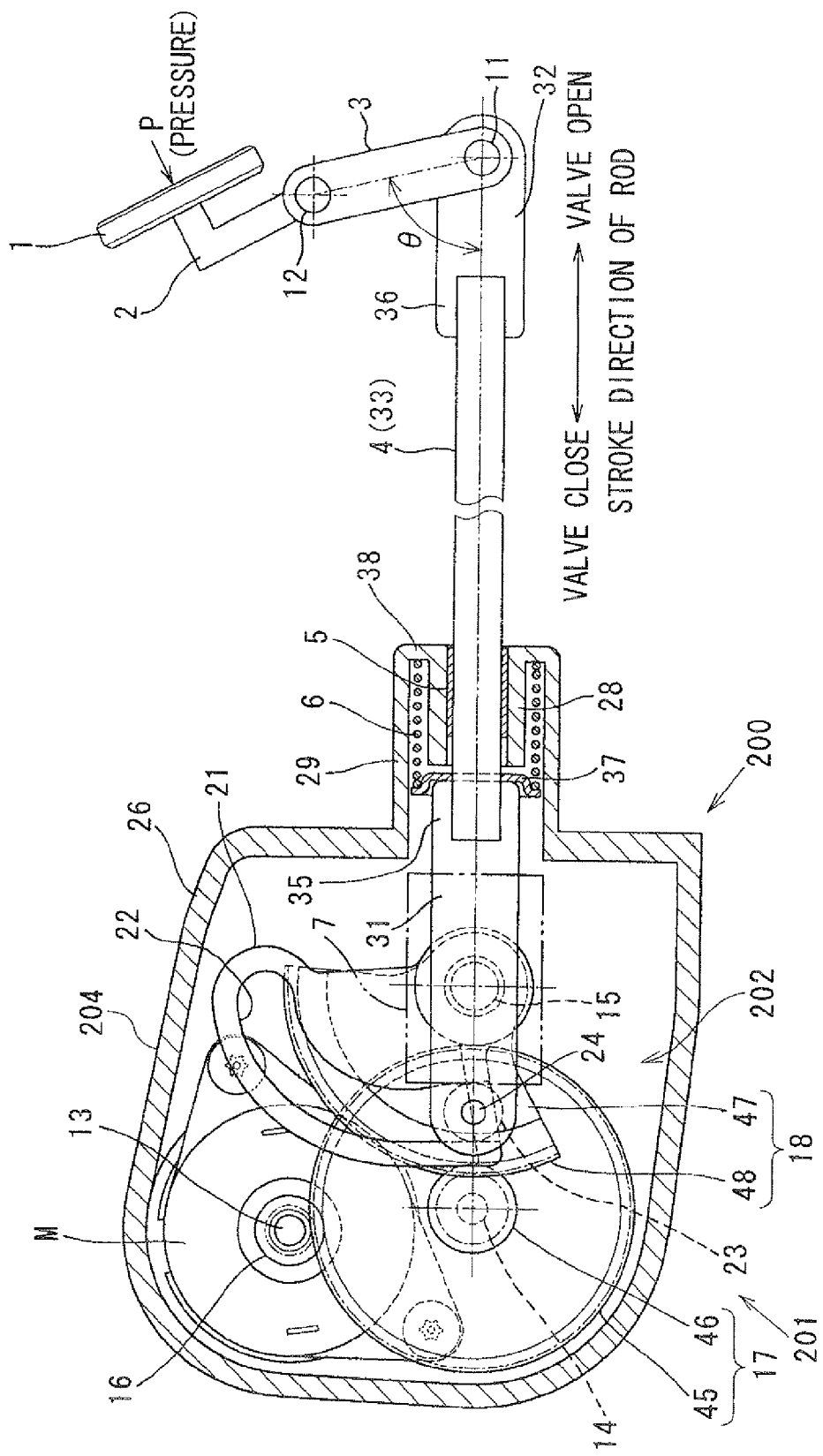
FIG. 4 is a descriptive view showing the wastegate valve control apparatus according to the first embodiment.
Figure 5:
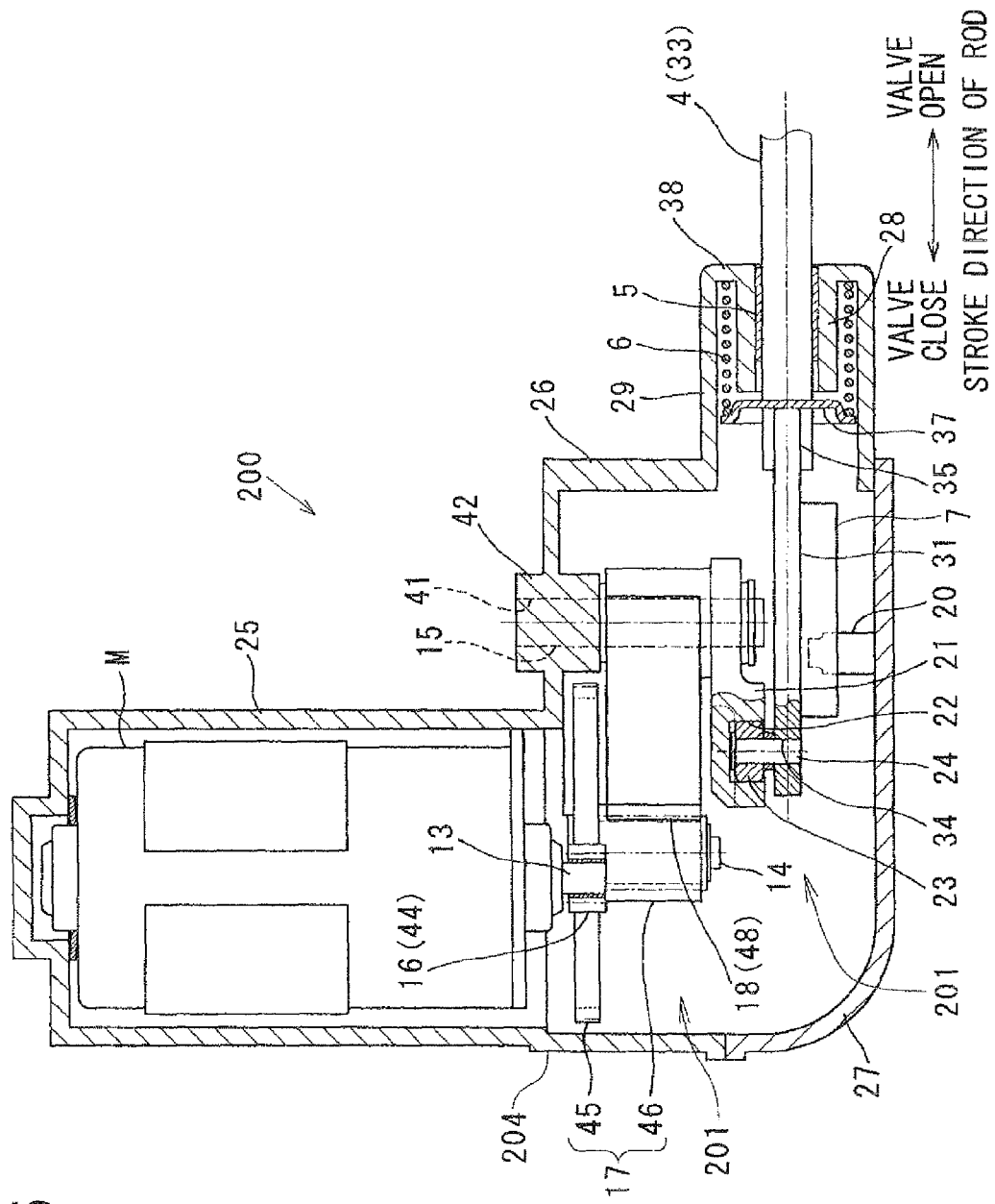
FIG. 5 is a cross-sectional view showing a valve full open state of the electric actuator according to the first embodiment.

FIGS. 1A to 5 show a first embodiment of the present invention. Specifically, FIG. 1A shows a positional relationship between a rod of an electric actuator and a link lever of a wastegate valve control apparatus of the present embodiment, and FIG. 1B shows a magnetic movable body of the wastegate valve control apparatus shown in FIG. 1A. FIGS. 2 and 4 show a valve full close state and a valve full open state, respectively, of the wastegate valve control apparatus. Furthermore, FIGS. 3 and 5 show the valve full close state and the valve full open state, respectively, of the electric actuator.

The wastegate valve control apparatus of an internal combustion engine of the present embodiment is implemented in a boost pressure control apparatus of the internal combustion engine. The wastegate valve control apparatus includes a wastegate valve 1, a link mechanism 300, the electric actuator 200 and an engine control unit (ECU) 400. The wastegate valve 1 opens and closes a wastegate passage (flow passage) 10 of a turbocharger. The link mechanism 300 includes a link lever 3, which is connected to a shaft 2 of the wastegate valve 1. The electric actuator 200 includes the rod 4, which is connected to the wastegate valve 1 through the link lever 3 to drive the wastegate valve 1. The ECU 400 variably controls the boost pressure of the internal combustion engine by controlling the opening and closing of the wastegate valve 1 based on an operational state of the internal combustion engine.

The wastegate valve 1 is a valve element of an exhaust gas flow quantity control valve, which controls a flow quantity of exhaust gas that flows through the wastegate passage 10 of the turbocharger installed to the engine. During an engine operation period, the wastegate valve 1 is rotated, i.e., pivoted within a valve operational range between a full close position and a full open position of the wastegate valve 1 based on a control signal outputted from the ECU 400 to change a size of an open area of the wastegate passage 10 (an exhaust gas passage cross-sectional area).

The shaft 2, which is configured into an L-shape, is provided integrally with the wastegate valve 1 at a rear surface of the wastegate valve 1 (a surface of the wastegate valve 1, which is opposite from a seat surface of the wastegate valve 1 that is seatable against a valve seat of the wastegate passage 10). Details of the wastegate valve 1 will be described later.

The electric actuator 200 controls the opening and closing of the wastegate valve 1 in response to the amount of displacement (the amount of stroke) of the rod 4 in a stroke direction (load application direction) of the rod 4.

Besides the rod 4, which is adapted to reciprocate in the axial direction of the rod 4, the electric actuator 200 further includes a thrust bearing (rod bearing) 5, a coil spring 6 and an actuator case 204. The thrust bearing 5 supports the rod 4 in such a manner that the rod 4 is slidable in a reciprocating direction of the rod 4 (a stroke direction of the rod 4, i.e., the axial direction of the rod 4) and is swingable (tiltable) in a top-to-bottom direction in FIG. 1A. The coil spring 6 exerts an urging force (spring load) to the rod 4 to urge the wastegate valve 1 in a closing direction (valve full close side). The actuator case 204 receives the components, such as the thrust bearing 5 and the coil spring 6. A distal end side of the rod 4 of the electric actuator 200 in the stroke direction thereof projects to an outside of the actuator case 204 from an annular end surface of the actuator case 204. Details of the electric actuator 200 will be described later.

In the present embodiment, the engine is a multi-cylinder diesel engine having a plurality of cylinders. An intake pipe is connected to intake ports of the cylinders of the engine to guide the intake air to the intake ports. A compressor of a turbocharger, an intercooler, a throttle valve and an intake manifold are installed in the intake pipe.

Furthermore, an exhaust pipe is connected to exhaust ports of the cylinders of the engine to guide exhaust gas from the cylinders. An exhaust manifold and a turbine of the turbocharger are installed in the exhaust pipe.

The turbocharger is a turbosupercharger that includes the turbine and the compressor. The intake air is compressed through the compressor and is then supplied to a combustion chamber of each of the cylinders of the engine.

The turbine includes a turbine housing, which is configured into a spiral form. A turbine impeller (turbine wheel) is placed in the turbine housing.

The compressor includes a compressor housing, which is configured into a spiral form. A compressor impeller (compressor wheel) is placed in the compressor housing.

The turbine impeller and the compressor impeller are connected with each other through a rotor shaft to rotate together.

In the turbocharger, when the turbine impeller is rotated by the exhaust gas, the compressor impeller is also rotated to compress the intake air.

Here, the turbine housing of the turbocharger of the present embodiment is provided with the wastegate passage 10 and the wastegate valve 1.

The wastegate passage 10 is a bypass passage (fluid passage) that bypasses the turbine impeller to guide the exhaust gas, which is guided into the turbine housing, to a portion of the exhaust passage located on the downstream side of the turbine impeller without passing through the turbine impeller.

Alternatively, the wastegate passage 10 may be a bypass passage (fluid passage). Specifically, the wastegate passage 10 may be branched off from a portion of the exhaust passage, which is located on a downstream side of a collection point of the exhaust manifold (point where branches of the exhaust manifold merge with each other), then the wastegate passage 10 may merge to a portion of the exhaust passage, which is located on a downstream side of the turbine of the turbocharger. That is, the wastegate passage 10 may be the bypass passage (fluid passage) that bypasses the turbine housing to conduct the exhaust gas without passing through the turbine housing.

The wastegate passage 10 of the present embodiment communicates between an upstream side communication hole (wastegate port), which opens at a partition wall of the inlet of the turbine housing, and a downstream side communication hole, which opens at a partition wall of the outlet of the turbine housing.

The wastegate valve 1 is made of a metal material (e.g., stainless steel) and is configured into a circular disk form. The wastegate valve 1 is an exhaust gas control valve, which includes a rotational axis extending in a direction perpendicular to an axial direction (flow direction of the exhaust gas) of the wastegate passage 10, particularly the wastegate port. The wastegate valve 1 is connected to the distal end part of the rod 4 of the electric actuator 200 such that the wastegate valve 1 is adapted to be seated against or be lifted away from the partition wall (valve seat) of the inlet of the turbine housing to close or open the wastegate passage 10, particularly the wastegate port. The wastegate valve 1 is rotatable about the rotational axis thereof to change the size of the open area of the wastegate passage 10, particularly the wastegate port in a continuous manner or a stepwise manner.

The link mechanism 300 is placed between the shaft 2 of the wastegate valve 1 and the rod 4 of the electric actuator 200 to convert linear motion of the rod 4 into rotational motion of the wastegate valve 1.

As shown in FIGS. 1A and 2, the link mechanism 300 includes the link lever 3. One end part of the link lever 3 is connected to the distal end part of the rod 4 (i.e., the end part of the rod 4 located distally in the stroke direction, i.e., the reciprocating direction of the rod 4), and the other end part of the link lever 3 is connected to the distal end part of the shaft 2 of the wastegate valve 1 (i.e., the end part of the shaft 2 opposite from the valve 1 side end part of the shaft 2).

A first hinge pin (first support shaft) 11 is fixed to (or is formed integrally with) the distal end part of the rod 4. The first hinge pin 11 is inserted from a rear surface side of the rod 4 and projects from a front surface side of the rod 4. A second hinge pin (second support shaft) 12 is formed integrally with (or is fixed to) the shaft 2 of the wastegate valve 1. The second hinge pin 12 projects in the same direction as that of the first hinge pin 11.

As shown in FIG. 1A, the link lever 3 includes a rotational axis (rotational center), which is coaxial with the rotational axis of the wastegate valve 1. Furthermore, the link lever 3 includes a first connection (rod-side connection), which is connected to the rod 4, and a second connection (valve-side connection), which is connected to the shaft 2 of the wastegate valve 1. The first connection has a first fitting hole, which has a circular cross section and into which the first hinge pin 11 is fitted. Furthermore, the second connection includes a second fitting hole, which has a circular cross section and into which the second hinge pin 12 is fitted.

Here, the first connection of the link lever 3 is a connection of the link lever 3 (also referred to as a center point, a connecting point of the connection or a rotational moving point) that moves along a corresponding rotational moving path (a rotational moving path of the link lever 3 indicated by a dot-dash line in FIG. 1A), which is a curved path that has a predetermined radius of curvature about the rotational axis of the link lever 3 (the rotational axis of the wastegate valve 1).

More specifically, the rotational moving path, i.e., the curved path of the link lever 3 is an arcuate path (the imaginary circle indicated by the dot-dash line in FIG. 3), which extends along the arcuate line having the predetermined radius of curvature about the rotational axis of the wastegate valve 1 (and thereby the rotational axis of the link lever 3). The rotational moving path of the link lever 3 connects between a full close point A of the link lever 3 along the rotational moving path of the link lever 3 and a full open point D of the link lever 3 along the rotational moving path of the link lever 3, as discussed in greater detail below.

The link lever 3 is rotatably supported by the outer peripheral portion of the first hinge pin 11. The link lever 3 is fixed to the second hinge pin 12.

The first hinge pin 11 rotatably supports the wastegate valve 1, the shaft 2 and the link lever 3.

The shaft 2 is bent at a right angle into an L-shape, and the second hinge pin 12 is fixed to the end part of the shaft 2, which is located on the electric actuator 200 side (lower side in FIG. 1A). The second hinge pin 12 is rotatably supported by a side wall portion of the turbine housing of the turbocharger. A rotational center (rotational axis) of the second hinge pin 12 is the rotational center (rotational axis) of the wastegate valve 1.

Therefore, the wastegate valve 1 serves as a hinged valve, which is connected to the distal end part of the rod 4 (i.e., the distal end part in the stroke direction of the rod 4) through the first hinge pin 11, the link lever 3 and the second hinge pin 12.

Next, details of the electric actuator 200 of the present embodiment will be described with reference to FIGS. 1A to 5.

The electric actuator 200 includes the rod 4, the thrust bearing 5, the coil spring 6, an electric motor M, a speed reducing mechanism 201, a converting mechanism 202, a rod stroke sensing device 203 (a magnetic movable body 7 and a stroke sensor 20 described later) and the actuator case 204. The electric motor M generates a drive force (motor torque) when the electric motor M receives an electric power and is thereby rotated. The speed reducing mechanism 201 reduces a rotational speed of the rotation, which is transmitted from the electric motor M, through two stages. The converting mechanism 202 converts the rotational motion of the speed reducing mechanism 201 into linear reciprocating motion of the rod 4. The rod stroke sensing device 203 senses a stroke position of the rod 4 of the electric actuator 200 (i.e., a position of the rod 4 along its stroke path). The actuator case 204 receives the above components of the electric actuator 200.

The speed reducing mechanism 201 includes three speed reducing gears 16-18. Specifically, the speed reducing mechanism 201 includes a motor shaft (a rotational shaft or an output shaft) 13 of the electric motor M, an intermediate gear shaft (first support shaft) 14, a final gear shaft (second support shaft) 15, a pinion gear (a motor gear) 16, an intermediate gear (a driving-side gear) 17 and a final gear (a spur gear also referred to as a driven-side gear) 18. The intermediate gear shaft 14 and the final gear shaft 15 are arranged parallel to the motor shaft 13. The pinion gear 16 is fixed to the motor shaft 13. The intermediate gear 17 is meshed with and is driven together with the pinion gear 16. The final gear 18 is meshed with and is driven together with the intermediate gear 17.

The converting mechanism 202 includes a plate cam 21, a follower 23 and a pivot pin (support shaft) 24. The plate cam 21 is rotatably supported. The follower 23 is movably received (slidably received) in a cam groove 22 of the plate cam 21. The pivot pin 24 rotatably supports the follower 23.

The actuator case 204 of the electric actuator 200 includes a motor housing 25, a gear housing 26 and a sensor cover 27. The motor housing 25 receives and holds the electric motor M. The gear housing 26 rotatably supports the speed reducing mechanism 201 and the converting mechanism 202. The sensor cover 27 covers an opening of the gear housing 26.

The motor housing 25 and the gear housing 26 are made of a metal material. The sensor cover 27 is made of a metal material or a resin material.

A bearing holder 28 is configured into a cylindrical tubular form and is located on a valve side (wastegate valve 1 side) of a side wall of the gear housing 26, and a bearing hole extends through the bearing holder 28 in the axial direction of the rod 4. A thrust bearing 5 is press-fitted to a hole wall surface of the bearing hole of the bearing holder 28. A spring holder 29 is configured into a cylindrical tubular form and projects from the side wall of the gear housing 26 toward the valve side (wastegate valve 1 side), and the coil spring 6 is received in the spring holder 29.

The rod 4 of the electric actuator 200 linearly extends in the stroke direction, which is the same as the direction of the central axis of the rod 4. The rod 4 includes a driving-side rod (first rod) 31, a driven-side rod (second rod) 32 and a connecting rod 33. The driving-side rod 31 is configured into a plate form (planar form) and is connected to the plate cam 21 through the follower 23 and the pivot pin 24. The driven-side rod 32 is configured into a plate from (planar form) and is connected to the shaft 2 of the wastegate valve 1 through the link mechanism 300 (e.g., the link lever 3). The connecting rod 33 is configured to have a circular cross section and connects between the driving-side rod 31 and the driven-side rod 32. The driving-side rod 31, the driven-side rod 32 and the connecting rod 33 are made of a metal material (non-magnetic material), such as stainless steel, and are joined together by, for example, welding to form a single-piece component.

The driving-side rod 31 is an input portion, which receives a load from the plate cam 21 through the follower 23 and the pivot pin 24. A surface of the driving-side rod 31 forms a magnetic movable body mount surface, to which the magnetic movable body 7 is fixed by, for example, mold forming (mold forming process) or screws. A fitting hole 34 is formed in one end part of the driving-side rod 31, which is opposite from the connecting rod 33, and the pivot pin 24 is fitted into the fitting hole 34. The pivot pin 24 is securely connected to, i.e., is fixed to the driving-side rod 31 such that the pivot pin 24 is inserted from a rear surface side of the driving-side rod 31 and protrudes from a front surface side of the driving-side rod 31.

A first connection 35 is formed at the other end part of the driving-side rod 31 and is connected to one end part of the connecting rod 33 by welding.

The driven-side rod 32 is an output portion, which applies a load to the wastegate valve 1 through the link lever 3 and the first and second hinge pins 11, 12. A second connection 36 is formed in one end part of the driven-side rod 32, which is adjacent to the connecting rod 33, and the second connection 36 is connected to the other end part of the connecting rod 33 by, for example, welding.

A fitting hole (not shown) is formed in the other end part of the driven-side rod 32, which is opposite from the connecting rod 33, and the first hinge pin 11 is fitted into this fitting hole. The first hinge pin 11 is securely connected to, i.e., is fixed to the driven-side rod 32 such that the first hinge pin 11 is inserted from a rear surface side of the driven-side rod 32 and protrudes from a front surface side of the driven-side rod 32.

The connecting rod 33 is a junction, which connects between the first connection 35 of the driving-side rod 31 and the second connection 36 of the driven-side rod 32. A spring seat 37, which is configured into an annular form (an annular flange form), is installed to an outer peripheral surface of the end part of the connecting rod 33, which is adjacent to the driving-side rod 31. The spring seat 37 is a load receiving portion, which receives a load of the coil spring 6 exerted toward the valve full close side (left side in FIG. 2) in the stroke direction. Furthermore, the connecting rod 33 is swingable about a bearing center O of the thrust bearing 5 and is slidable in the axial direction of the thrust bearing 5. The spring seat 37 is engaged to an end surface of the first connection 35 of the driving-side rod 31.

The thrust bearing 5 slidably supports the connecting rod 33 in such a manner that the connecting rod 33 is slidable in the stroke direction (reciprocating direction) thereof. A through-hole (slide hole) is formed in an inside of the thrust bearing 5 to extend through the thrust bearing 5 in the axial direction of the rod 4. In a longitudinal cross-sectional view, an inner peripheral surface of the thrust bearing 5 (a slide surface, along which the connecting rod 33 slides) forms a curved convex surface, which protrudes toward the central axis of the rod 4, at the bearing center O of the thrust bearing 5. In other words, the inner peripheral surface of the thrust bearing 5 is curved such that an inner diameter of the thrust bearing 5 progressively increases from an axial center part of the thrust bearing 5 toward each of first and second axial end parts of the thrust bearing 5 in the axial direction. In this way, the swing motion (swing motion) of the connecting rod 33 is permitted.

The coil spring 6 serves as a rod (valve) urging means for generating an urging force (load) to urge the rod 4 toward the valve full close side (the side, at which the wastegate valve 1 is fully closed, i.e., the left side in FIG. 1A) in the axial direction of the central axis of the rod 4. One end part of the coil spring 6 is held by the spring seat 37, and the other end part of the coil spring 6 is held by an annular partition wall (closure wall) 38, which connects between the end part of the bearing holder 28 and the end part of the spring holder 29.

In this way, the rod 4 of the electric actuator 200, particularly the driving-side rod 31 receives the spring load of the coil spring 6 (load of the coil spring 6, which urges the rod 4 toward the valve full close side).

The speed reducing mechanism 201 forms a drive force transmitting mechanism, which transmits the torque of the electric motor M to the converting mechanism 202. The speed reducing mechanism 201 includes the intermediate gear shaft 14, the final gear shaft 15, the pinion gear 16, the intermediate gear 17 and the final gear 18, as discussed above.

The intermediate gear shaft 14 and the final gear shaft 15 are arranged generally parallel to each other. Furthermore, the three gears 16-18 are rotatably received in a speed reducing gear receiving space of the gear housing 26.

The intermediate gear shaft 14 is press-fitted into the fitting hole (fitting portion) of the gear housing 26. A central axis of the intermediate gear shaft 14 forms a rotational center (rotational axis) of the intermediate gear 17. The intermediate gear 17 is rotatably supported by an outer peripheral surface of the intermediate gear shaft 14 through two bearings (not shown). Alternatively, the two bearings may be eliminated, if desired.

A circumferential groove, which is in an annular form, is formed in an outer peripheral surface of a projecting part of the intermediate gear shaft 14, which projects from an end surface of the intermediate gear 17. An intermediate gear removal limiting means, such as a washer or a C-ring, which limits unintentional removal of the intermediate gear 17 from the intermediate gear shaft 14 upon the fitting of the intermediate gear 17 to the outer peripheral surface of the intermediate gear shaft 14, is installed to the circumferential groove.

The final gear shaft 15 is securely press-fitted into a fitting hole 41 of the gear housing 26 and is thereby securely press-fitted to a fitting portion 42, which is configured into a cylindrical tubular form. A central axis of the final gear shaft 15 forms a rotational center (rotational axis) of the final gear 18. The final gear 18 is rotatably supported by an outer peripheral surface of the final gear shaft 15 through two bearings 43. Alternatively, the two bearings 43 may be eliminated, if desired.

A circumferential groove, which is in an annular form, is formed in an outer peripheral surface of a projecting part of the final gear shaft 15, which projects from an end surface of the final gear 18. A final gear removal limiting means, such as a washer or a C-ring, which limits unintentional removal of the final gear 18 from the final gear shaft 15 upon the fitting of the final gear 18 to the outer peripheral surface of the final gear shaft 15, is installed to the circumferential groove.

The pinion gear 16 is made of a metal material or a resin material. The pinion gear 16 is securely press-fitted to an outer peripheral surface of the motor shaft 13. The pinion gear 16 includes a plurality of projecting teeth (pinion gear portion having the teeth) 44, which are arranged one after another in a circumferential direction along an outer peripheral surface of the pinion gear 16 and are meshed with the intermediate gear 17.

The intermediate gear 17 is made of a metal material or a resin material and is rotatably fitted to an outer peripheral surface of the intermediate gear shaft 14. The intermediate gear 17 includes a cylindrical tubular portion, which is placed to surround an outer peripheral surface of the intermediate gear shaft 14. A largest diameter portion (large diameter portion), which is configured into an annular form, is formed integrally in an outer peripheral surface of the cylindrical tubular portion.

The large diameter portion of the intermediate gear 17 includes a plurality of projecting teeth (a large diameter gear portion having the teeth) 45, which are arranged one after another in a circumferential direction along an outer peripheral surface of the large diameter portion of the intermediate gear 17 and are meshed with the projecting teeth 44 of the pinion gear 16. A cylindrical tubular portion (a small diameter portion) of the intermediate gear 17 includes a plurality of projecting teeth (small diameter gear portion having the teeth) 46, which are arranged one after another in a circumferential direction along an outer peripheral surface of the cylindrical tubular portion (the small diameter portion).

The final gear 18 is made of a metal material or a resin material and is rotatably fitted to an outer peripheral surface of the final gear shaft 15 through the bearings 43. The final gear 18 includes a cylindrical tubular portion, which is placed to surround an outer peripheral surface of the final gear shaft 15 in a circumferential direction. The cylindrical tubular portion of the final gear 18 includes a flange 47, which is configured into a sector shape (fan shape) and radially outwardly projects from an outer peripheral surface of the cylindrical tubular portion of the final gear 18.

The flange 47 of the final gear 18 includes a plurality of projecting teeth (large diameter sector gear portion having the teeth) 48, which are arranged one after another in a circumferential direction along an outer peripheral surface of the flange 47 of the final gear 18 through a predetermined angular range. The projecting teeth 48 of the flange 47 of the final gear 18 are meshed with the projecting teeth 46 of the intermediate gear 17.

The converting mechanism 202 is a motion direction converting mechanism, which converts rotational motion of the final gear 18 into linear motion of the rod 4. The converting mechanism 202 includes the plate cam 21, the follower 23 and the pivot pin 24. The plate cam 21 is rotated integrally with the final gear 18 about the final gear shaft 15 of the final gear 18. The follower 23 is movably received (slidably received) in the cam groove 22 of the plate cam 21. The pivot pin 24 rotatably supports the follower 23.

The plate cam 21 is made of a metal material and is configured into a predetermined shape. The plate cam 21 is fixed to a cam installation portion of the final gear 18. In a case where the final gear 18 is made of a resin material, the plate cam 21 is insert-molded into the final gear 18. In a case where the final gear 18 is made of a metal material, the final gear 18 and the plate cam 21 may be formed together from sintered metal. In this way, the rotational axis of the final gear 18 coincides with the rotational axis of the plate cam 21, and thereby the rotational center of the final gear 18 (rotational center of the final gear shaft 15) coincides with the rotational center of the plate cam 21. Furthermore, an operational angle of the final gear 18 (a final gear operational angle) becomes the same as a rotational angle of the plate cam 21 (cam rotational angle).

The cam groove 22 of the plate cam 21 is a guide portion, which is configured into a curved form that corresponds to a moving pattern of the wastegate valve 1.

A cam shape of the plate cam 21 and a rotational angle of the plate cam 21 are determined for a required amount of stroke of the rod 4, which is required to drive the wastegate valve 1 from the full close position to the full open position.

The follower 23 is made of a metal material and is configured into a cylindrical tubular form. The follower 23 is rotatably fitted to an outer peripheral surface of the pivot pin 24. The follower 23 includes a cylindrical tubular portion, which surrounds the pivot pin 24 in a circumferential direction.

The pivot pin 24 is fitted into the fitting hole 34 of the rod 4 and is thereby securely press-fitted to the rod 4. A flange, which is swaged into a collar form to limit removal of the follower 23, is formed in a projecting part of the pivot pin 24, which projects from an end surface of the cylindrical tubular portion of the follower 23.

A rotational center of the follower 23 and a rotational center of the plate cam 21 are located along the central axis of the rod 4, i.e., a rod central axis RC.

The electric motor M is a drive source of the electric actuator 200 and is received in a motor receiving space of the motor housing 25. The energization of the electric motor M is controlled by the ECU 400.

The ECU 400 includes a microcomputer of a known type, which includes a CPU, a ROM and a RAM. The ECU 400 controls an electric actuator of a throttle valve and the electric actuator 200 of the wastegate valve 1 based on output signals received from the stroke sensor 20, a crank angle sensor, an accelerator opening degree sensor, a throttle opening degree sensor, a boost pressure sensor and a vehicle speed sensor.

Next, details of the rod stroke sensing device 203 will be described with reference to FIGS. 1A to 5.

The rod stroke sensing device 203 includes the magnetic movable body 7 and the stroke sensor 20. The magnetic movable body 7 is provided integrally with the rod 4, i.e., is fixed to the rod 4. The stroke sensor 20 senses the stroke position of the magnetic movable body 7 and thereby of the rod 4.

The ECU 400 has a function of a rod stroke sensing means for computing (sensing) the linear stroke position (amount of displacement) of the rod 4 of the electric actuator 200 based on the output value (sensor output value), which is outputted from the stroke sensor 20 as the electric signal.

The magnetic movable body 7 is provided integrally with, i.e., is installed integrally to the rod 4 to linearly move in response to the movement of the rod (serving as a sensing subject) 4 in the stroke direction. With reference to FIGS. 1A and 1B, the magnetic movable body 7 includes first and second permanent magnets (hereinafter simply referred to as first and second magnets) 8*a*, 8*b* and a magnetic frame (magnetic body) 9. In FIG. 1A, the first and second magnets 8*a*, 8*b* are not depicted for the sake of simplicity. Each of the first and second magnets 8*a*, 8*b* is configured into the rectangular parallelepiped form and is fixed to the magnetic frame 9 such that a generally planar inner surface 8*a*1 of the first magnet 8*a* (or simply referred to as a planar inner surface 8*a*1 of the first magnet 8*a*) and a generally planar inner surface 8*b*1 of the second magnet 8*b* (or simply referred to as a planar inner surface 8*b*1 of the second magnet 8*b*) are directly opposed to each other in a sensor receiving space 9a of the magnetic frame 9. The first and second magnets 8a, 8b generate a generally parallel magnetic field having a generally constant density of the magnetic flux therebetween. The magnetic frame 9 is configured into an elongated rectangular frame (in a plan view) and concentrates a magnetic flux (magnetic field) generated between the first and second magnets 8a, 8b onto the stroke sensor 20 received in the sensor receiving space 9a of the magnetic frame 9. Each of the first and second magnets 8a, 8b is magnetized to form a generally parallel magnetization pattern such that magnetic lines of force are generally parallel to each other.

The magnetic frame (magnetic body) 9 is made of a magnetic material, such as iron, nickel, ferrite, which forms a closed magnetic path. The magnetic frame 9 includes upper and lower blocks (axially extending blocks, hereinafter referred to as blocks) 51, 52 and left and right blocks (perpendicularly extending blocks) 53, 54, which are integrated together. Each of the upper and lower blocks 51, 52 is configured into a rectangular parallelepiped form and extends in the longitudinal direction, i.e., extends in the direction generally parallel to the rod central axis RC. Each of the left and right blocks 53, 54 is configured into a rectangular parallelepiped form and extends in a transverse direction, i.e., extends in a direction generally perpendicular to the rod central axis RC. The magnetic movable body 7 is securely held on the magnetic movable body mount surface of the driving-side rod 31 by the fixing means (e.g., by the mold forming or the screws).

Alternatively, the first and second magnets 8a, 8b may be provided to the stroke sensor 20 side, and the magnetic movable body 7 may include only the magnetic frame 9.

With reference to FIGS. 1A and 1B, the first magnet 8a is fixed to the center part of block 51, and the second magnet 8b is fixed to the center part of the block 52. A center line MC between the first and second magnets 8a, 8b is generally parallel to and is centered between the planar inner surface 8a1 of the first magnet 8a and the planar inner surface 8b1 of the second magnet 8b that are directly opposed to each other. In FIG. 1A, the N-pole of the first magnet 8a and the S-pole of the second magnet 8b are indicated with N and S, respectively, without depicting the first and second magnets 8a, 8b for the sake of simplicity.

The stroke sensor 20 is held by a sensor mounting portion (sensor holder) of the sensor cover 27 such that the stroke sensor 20 is positioned in the middle of the magnetic movable body 7 (in the middle of the magnetic circuit made of the first and second magnets 8a, 8b and the magnetic frame 9), i.e., is positioned in the sensor receiving space 9a of the magnetic frame 9. The stroke sensor 20 is placed such that the stroke sensor 20 projects from the sensor mounting portion (sensor holder) of the sensor cover 27 toward the driving-side rod 31.

Figure 12A:
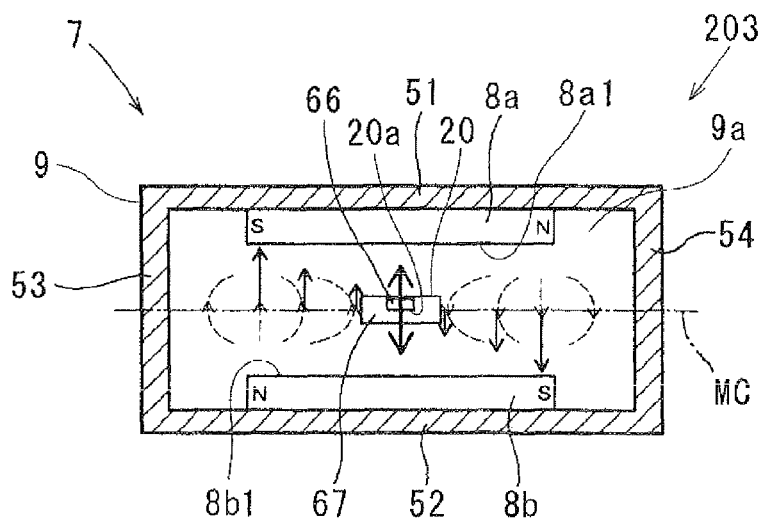
FIGS. 12A and 12B are schematic diagrams showing examples of a magnetic movable body, which is adapted to move in a stroke direction relative to a stroke sensor according to a sixth embodiment of the present invention.

The stroke sensor 20 includes a Hall element that is a contactless magnetic sensing element, which senses the magnetic flux (a magnetic flux density, a magnetic field distribution, a magnetic field strength) that changes in response to the movement of the magnetic movable body 7 relative to the stroke sensor 20 in the stroke direction. The Hall element of the stroke sensor 20 has a magnetic sensing surface 20a (see, for example, FIG. 12A) to sense the flux density (the amount of magnetic flux) of the magnetic field or the strength of the magnetic field applied from the magnetic movable body 7, particularly, the first and second magnets 8a, 8b. Here, it should be noted that the location of the magnetic sensing surface 20a indicated in FIG. 12A is a mere example and may be changed to any other location within the Hall element as long as the magnetic sensing surface is parallel to the surface where the magnetic sensing surface 20a of the stroke sensor 20 is indicated in FIG. 12A.

The Hall element of the stroke sensor 20 is a main constituent component of a Hall IC. That is, the Hall IC has the Hall element, which is formed as a sensor chip (Hall element chip), and outputs an electric signal (a voltage signal, i.e., a sensor output signal, which will be hereinafter also referred to as a sensor output value) that corresponds to a density of the magnetic flux that passes the magnetic sensing surface 20a of the Hall element. Besides the sensor chip, the Hall IC of the stroke sensor 20 further includes a lead frame and a package configured into a rectangular parallelepiped form. The sensor chip (Hall element chip) includes the Hall element (the magnetic sensing element) and a voltage amplifier. The Hall element outputs the electric signal (output voltage), which is proportional to the density of the magnetic flux generated between the first and second magnets 8a, 8b. The voltage amplifier outputs an amplified signal, which is generated by amplifying the output voltage of the Hall element. The lead frame is connected to electrode pads of the sensor chip. The package is formed with dielectric resin, which encapsulates the sensor chip and the lead frame. The sensor chip is mounted to a surface of the lead frame through a dielectric bonding agent.

The Hall IC is placed in the rectangular sensor receiving space 9a, which is formed in the inside of the magnetic frame 9, in such a manner that a relative movement of the Hall IC relative to the magnetic movable body 7 is possible. In place of the Hall IC, the Hall element(s) alone or a magnetoresistive element(s) may be used as the contactless magnetic sensing element(s) of the stroke sensor 20.

At the stroke sensor 20, in a case where the wastegate valve 1 is placed between the full close position and the full open position, the stroke position of the magnetic movable body 7 (a relative position of the magnetic movable body 7 relative to a reference position) and the amount of stroke of the rod 4 correspond with each other, and the stroke position of the rod 4 and the valve opening degree of the wastegate valve 1 correspond with each other. Therefore, the ECU 400 can obtain the amount of stroke of the rod 4 by measuring the stroke position of the magnetic movable body 7, i.e., by measuring the sensor output value, which is outputted in response to a change in the magnetic field. Then, the ECU 400 can obtain the valve opening degree of the wastegate valve 1 based on the thus obtained amount of stroke of the rod 4. Thereafter, the ECU 400 can obtain a flow quantity of the exhaust gas, which flows through the wastegate passage 10, based on the thus obtained valve opening degree of the wastegate valve 1.

Here, in the case where the stroke position of the magnetic movable body 7, which is the magnetic circuit made of the first and second magnets 8a, 8b and the magnetic frame 9, is sensed with the Hall IC, the Hall element or the MR element in the contactless manner, when a magnetic material (e.g., iron) is placed adjacent to the magnetic circuit made of the magnetic movable body 7 and the Hall IC of the stroke sensor 20, the magnetic field, which is sensed with the contactless magnetic sensing element, may not be stably obtained in some cases. In view of the above point, in the electric actuator 200 of the present embodiment, the corresponding components (e.g., the rod 4, the final gear 18, the plate cam 21, the follower 23, the pivot pin 24 and the final gear shaft 15) are made of a non-magnetic material (e.g., non-magnetic metal, such as stainless steel, or non-magnetic resin), so that the influence of the external disturbance on the magnetic circuit is avoided or is alleviated.

In the wastegate valve control apparatus of the present embodiment, with reference to FIG. 1A, the Hall IC, particularly the Hall element of the stroke sensor 20 is arranged as follows with respect to the magnetic movable body 7, which is the magnetic circuit made of the first and second magnets 8a, 8b and the magnetic frame 9.

First of all, the positional relationship of the link lever 3 relative to the various opening degrees of the wastegate valve 1 will be described. With reference to FIG. 1A, when the wastegate valve 1 is placed to have its full close degree (the opening degree, at which the wastegate valve 1 fully closes the wastegate passage 10), the rotational moving point of the link lever 3 along the rotational moving path of the link lever 3 (the imaginary circle indicated by the dot-dash line in FIG. 1A) is placed in the full close point A of the link lever 3 (more specifically, the full close point A of the rod-side connection of the link lever 3). A point, which is symmetric to the full close point A with respect to the bearing center O of the thrust bearing 5, is referred to as a point A'. Furthermore, when the wastegate valve 1 is placed to have its full open degree (the opening degree, at which the wastegate valve 1 fully opens the wastegate passage 10), the rotational moving point of the link lever 3 along the rotational moving path of the link lever 3 (the imaginary circle indicated by the dot-dash line in FIG. 1A) is placed in the full open point D of the link lever 3 (more specifically, the full open point D of the rod-side connection of the link lever 3).

A straight line, which connects between the rotational axis LO of the link lever 3 and the full close point A at the time of fully closing the wastegate valve 1, is referred to as a full close time lever central axis L1. Furthermore, a straight line, which connects between the rotational axis LO of the link lever 3 and the full open point D at the time of fully opening the wastegate valve 1, is referred to as a full open time lever central axis L2.

Furthermore, an angular center line, which is centered in, i.e., bisects an angular range between the full close time lever center line L1 and the full open time lever center line L2, is referred to as a lever operational angle center line LC.

Furthermore, the center line of the rod 4, which extends in the stroke direction (axial direction) of the rod 4, is referred to as the rod central axis RC, as discussed earlier. A node, at which the lever motion center line LC intersects with the rod central axis RC at the right angle, is referred to as a half point B. The half point B is a half point between the full close point A and the full open point D along the rotational moving path of the link lever 3. Therefore, when the opening degree of the wastegate valve 1 becomes a half degree, which is one half of an angular degree between the full close degree of the wastegate valve 1 and the full open degree of the wastegate valve 1, the rotational moving point of the link lever 3 (the rotational moving point of the rod-side connection of the link lever 3) is placed in the half point B. Furthermore, a point, which is symmetric to the half point B with respect to the bearing center O of the thrust bearing 5, is referred to as a point B'.

As discussed above, the central axis RC of the rod 4 is generally parallel to the center line MC of the first and second magnets 8a, 8b. Therefore, when the rotational moving point of the link lever 3 (the rod-side connection of the link lever 3 at the first hinge pin 11) is placed in the full close point A, the center line MC of the first and second magnets 8a, 8b of the magnetic movable body 7, which is fixed to the rod 4, coincides with a first imaginary line KA shown in FIG. 1A. The first imaginary line KA is an imaginary straight line that is generally parallel to an imaginary line, which connects between the point A and the point A' through the bearing center O. When the rotational moving point of the link lever 3 (the rod-side connection of the link lever 3 at the first hinge pin 11) is placed in the half point B, the center line MC of the first and second magnets 8a, 8b coincides with a second imaginary line KB shown in FIG. 1A. The second imaginary line KB is an imaginary straight line that is generally parallel to an imaginary line, which connects between the point B and the point B° through the bearing center O. The first and second imaginary lines KA, KB intersect with each other at a node X shown in FIG. 1A.

With the above settings, the location of the magnetic sensing surface 20a of the stroke sensor 20 (the Hall IC, particularly the Hall element) is set as follows. Specifically, the magnetic sensing surface 20a of the stroke sensor 20 is placed in an angular range between the first imaginary line KA and the second imaginary line KB. In the present instance, the magnetic sensing surface 20a of the stroke sensor 20 is entirely placed in the angular range between the first imaginary line KA and the second imaginary line KB. Alternatively, it is possible to place only a portion of the magnetic sensing surface 20a in the angular range between the first imaginary line KA and the second imaginary line KB, if desired. Furthermore, in the present embodiment, the magnetic sensing surface 20a is generally parallel to or generally coincides with a third imaginary line (imaginary reference line) KC that is an imaginary straight line, which is located within the angular range between the first imaginary line KA and the second imaginary line KB and passes through the node X shown in FIG. 1A. Alternatively, the magnetic sensing surface 20a may be generally parallel to or generally coincide with any other imaginary line, which is an imaginary straight line that passes the node X and is located within the angular range between the first imaginary line KA and the second imaginary line KB.

Next, the operation of the electric actuator 200, which controls the opening and closing of the wastegate valve 1, will be briefly described with reference to FIGS. 1A to 5.

In the case where the boost pressure, which is sensed with the boost pressure sensor, is smaller than a predetermined value, the supply of the electric power to the electric motor M is controlled by the ECU 400 to place the wastegate valve 1 into the full close state where the wastegate valve 1 has the full close degree.

In this way, the components of the electric actuator 200 are stopped in the full close state, so that the wastegate valve 1 maintains the full close state (full close degree). Thereby, the wastegate passage 10 is closed. Thus, the entire amount of exhaust gas, which is outputted from the engine, is supplied into the inlet of the turbine housing of the turbocharger to rotate the turbine impeller and is thereafter discharged from the outlet of the turbine housing.

The intake air, which is drawn into the intake pipe, is compressed by the compressor impeller driven through the rotation of the turbine impeller, so that the pressure (boost pressure) of the intake air is increased. The pressurized intake air is then drawn into the engine.

In a case where the boost pressure, which is sensed with the boost pressure sensor, is increased equal to or larger than the predetermined value, i.e., the boost pressure exceeds a predetermined maximum boost pressure, the supply of the electric power to the electric motor M is controlled by the ECU 400 to place the wastegate valve 1 in the full open state where the wastegate valve 1 has the full open degree.

In this way, the motor shaft 13 of the electric motor M is rotated in a full open direction. Thereby, the motor torque is conducted to the pinion gear 16, the intermediate gear 17 and the final gear 18. The plate cam 21, to which the motor torque is conducted from the final gear 18, is rotated in the full open direction by a predetermined rotational angle (a rotational angle equal to the operational angle of the final gear 18) in response to the rotation of the final gear 18.

Then, the pivot pin 24 slides along the cam groove 22 to move from the full close position to the full open position, so that the driving-side rod 31 is linearly moved (pushed) toward the valve open side in the stroke direction of the rod 4 while compressing the coil spring 6. Thereby, the driving-side rod 31, the driven-side rod 32 and the connecting rod 33 are linearly moved toward the valve open side in the stroke direction of the rod 4.

Furthermore, the first hinge pin 11 is linearly moved toward the valve open side in the stroke direction of the rod 4 in response to the linear movement of the driven-side rod 32, so that the link lever 3 is rotated in the full open direction about the second hinge pin 12. At this time, the wastegate valve 1 is rotated toward the full open direction about the second hinge pin 12 in response to the rotation of the second hinge pin 12. In this way, the wastegate valve 1 is lifted away from the valve seat and is placed in the full open state, so that the wastegate passage 10 is opened. At this time, the operational angle (lever angle) of the link lever 3 relative to the rod central axis RC of the rod 4 is θ (see FIG. 4).

Thereby, a portion of the exhaust gas, which is supplied from the engine into the inlet of the turbine housing, flows through the wastegate passage 10, which bypasses the turbine impeller, and then this exhaust gas is discharged through the wastegate passage 10 through the outlet of the turbine housing. In this way, the exhaust gas energy, which is applied to the turbine impeller, is reduced, and thereby the rotational speed of the turbine impeller is reduced. Thus, the excessive rotation of the turbocharger is limited.

Furthermore, the boost pressure or exhaust gas pressure does not become excessive. In addition, a damage of the turbine impeller, which would be caused by excessive rotation of the turbine impeller, is limited.

In the case where the boost pressure, which is sensed with the boost pressure sensor, is decreased below the predetermined value, the supply of the electric power to the electric motor M is controlled by the ECU 400 to place the wastegate valve 1 into the full close state.

In this way, the motor shaft 13 of the electric motor M is rotated in a full close direction. Thereby, the motor torque is conducted to the pinion gear 16, the intermediate gear 17, the final gear 18 and the plate cam 21. Thus, the plate cam 21 is rotated by a predetermined angular range in the full close direction in response to the rotation of the final gear 18.

Then, the pivot pin 24 slides along the cam groove 22 to move from the full open position to the full close position, so that the rod 4 is linearly moved (pulled) toward the valve close side in the stroke direction of the rod 4. Thereby, the driving-side rod 31, the driven-side rod 32 and the connecting rod 33 are linearly moved toward the valve close side in the stroke direction of the rod 4.

Furthermore, the first hinge pin 11 is linearly moved toward the valve close side in the stroke direction of the rod 4 in response to the linear movement of the driven-side rod 32, so that the link lever 3 is rotated in the full close direction about the second hinge pin 12. At this time, the wastegate valve 1 is rotated toward the full close direction about the second hinge pin 12 in response to the rotation of the second hinge pin 12. In this way, the wastegate valve 1 is seated against the valve seat and is placed in the full close state, so that the wastegate passage 10 is closed.

Furthermore, the wastegate valve 1 is controlled and is thereby set to an intermediate opening degree (half degree) between the full close degree (full close position) and the full open degree (full open position) based on the operational state of the engine, particularly the boost pressure, which is sensed with the boost pressure sensor. In this case, the valve opening degree of the wastegate valve 1 is changed in a linear manner or stepwise manner based on the boost pressure, so that the flow quantity of the exhaust gas, which passes through the wastegate passage 10, can be finely adjusted in a linear manner or stepwise manner. Thereby, the boost pressure of the engine can be variably controlled in a linear manner or stepwise manner.

Now, a first characteristic of the first embodiment will be described. As discussed above, in the wastegate valve control apparatus of the present embodiment, the link mechanism 300, which converts the linear motion of the rod 4 into the rotational motion of the wastegate valve 1, is provided between the shaft 2 of the wastegate valve 1 and the rod 4 of the electric actuator 200. The link mechanism 300 includes the link lever 3, which has the one end part connected to the driven-side rod 32 through the first hinge pin 11 and the other end part connected to the shaft 2 of the wastegate valve 1 through the second hinge pin 12.

In the case of the hinged valve structure described above, when the link lever 3 is rotated by the thrust force of the rod 4 of the electric actuator 200 to rotate the wastegate valve 1, the swing motion is generated in the rod 4 to swing the rod 4 about the bearing center O of the thrust bearing 5. When the rod 4 is swung, a distance between each of the pole surfaces of the magnetic movable body 7, which is provided integrally with the driving-side rod 31, and the magnetic sensing surface 20*a* of the Hall element of the stroke sensor 20 is changed. Thereby, a change in the density of the magnetic flux (the strength of the magnetic field), which passes through the magnetic sensing surface 20*a* of the Hall element, does not correspond to the stroke position of the rod 4 and is thereby fluctuated. Thus, the reliability of the sensor output value is deteriorated.

In view of such a disadvantage, in the wastegate valve control apparatus of the present embodiment, the magnetic sensing surface 20*a* of the Hall IC, particularly the Hall element of the stroke sensor 20 is generally parallel to or generally coincides with the third imaginary line KC, which extends through the node X and is located within the angular range between the first imaginary line KA and the second imaginary line KB.

Figure 6A:
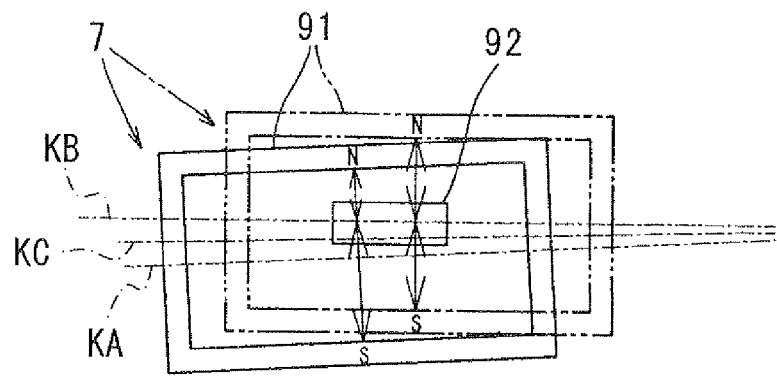
FIG. 6A is a descriptive view showing an example of a location of a sensor in a comparative example.

In this way, even in the case where the rod 4 is moved curvedly about the bearing center O of the thrust bearing 5 to cause a change in the magnetic flux (the strength of the magnetic field) in a curving manner, it is possible to reduce or minimize a change in the density of the magnetic flux (the strength of the magnetic field) relative to the magnetic sensing surface 20*a* of the Hall element in comparison to a comparative example of FIG. 6A (a positioning example where a magnetic sensing surface of a sensor 92 is placed to coincide with a center line of a magnetic circuit 91 that is placed in a rod straight state, i.e., in a non-tilted state of the rod 4).

Thereby, even in the case where an amplitude of the swing of the rod 4, i.e., the amplitude of the swing of the magnetic movable body 7 differs between an adjacent state (close state), in which the first and second magnets 8*a*, 8*b* and the magnetic frame 9 of the magnetic movable body 7 are adjacent to, i.e., close to the bearing center O of the thrust bearing 5, and a distant state, in which the first and second magnets 8*a*, 8*b* and the magnetic frame 9 of the magnetic movable body 7 are distant from the bearing center O of the thrust bearing 5, the amount of variation in the magnetic flux (the strength of the magnetic field), which is received by the magnetic sensing surface 20*a* of the Hall element from the pole surfaces of the magnetic movable body 7, becomes small. Therefore, it is possible to reduce or minimize the difference in the sensor output value of the Hall IC of the stroke sensor 20 caused by the difference in the amplitude of the swing of the rod 4, i.e., the amplitude of the swing of the magnetic movable body 7.

Here, with reference to FIG. 1A, a length of each arrow between the stroke sensor 20 (Hall IC) and the magnetic frame 9 of the magnetic movable body 7 indicates the strength of the magnetic field applied to the magnetic sensing surface 20a of the Hall element of the stroke sensor 20. Furthermore, with reference to FIG. 6A, a length of each arrow between the sensor (Hall IC) 92 and the magnetic circuit (magnetic frame) 91 indicates the strength of the magnetic field applied to the magnetic sensing surface of the Hall element of the sensor (Hall IC) 92. As is understandable with reference to FIGS. 1A and 6A, the difference in the strength of the magnetic field applied to the magnetic sensing surface of the Hall element is larger in the comparative case of FIG. 6A in comparison to the case of FIG. 1A. That is, the difference is smaller in the first embodiment shown in FIG. 1A.

Specifically, it is possible to reduce or minimize the difference between the sensor output value caused by the swing of the rod 4 in the case where the distance between the bearing center O of the thrust bearing 5 and the magnetic movable body 7 is small (close), and the sensor output value caused by the swing of the rod 4 in the case where the distance between the bearing center O of the thrust bearing 5 and the magnetic movable body 7 is large (distant). Therefore, the sensing accuracy of the linear stroke position of the rod 4 can be improved, so that the controllability of the amount of stroke of the rod 4, i.e., the controllability of the opening degree of the wastegate valve 1 can be improved.

Now, a second characteristic of the first embodiment will be described. Lately, in many countries, it is mandatory to install an on-board diagnostic (OBD) system for the exhaust gas on the vehicle due to the enhancement of the regulation with respect to the exhaust gas of the engine installed on the vehicle.

In the case of the wastegate valve control apparatus, which linearly controls the opening or closing of the wastegate valve 1 based on the sensor output signal outputted from the boost pressure sensor, the stroke position of the rod 4 needs to be directly sensed as specified by the OBD requirement.

Therefore, in the wastegate valve control apparatus, the magnetic movable body 7 is provided integrally on the driving-side rod 31, which is connected to the wastegate valve 1, through the link lever 3 of the link mechanism 300.

The stroke position of the magnetic movable body 7, which is moved integrally with the driving-side rod 31 of the rod 4, is sensed with the Hall IC of the stroke sensor 20. Thereby, the stroke position of the rod 4, which is the final operational stage of the electric actuator 200 in the force transmission path, can be directly sensed. Thereby, the controllability of the amount of stroke of the rod 4, i.e., the controllability of the opening degree of the wastegate valve 1 can be improved in the case where a target valve opening degree is computed in conformity with, for example, the sensor output value (sensed value) of the boost pressure sensor, and the supply of the electric power to the electric motor M is variably controlled (feedback controlled) in response to a difference between the actual valve opening degree sensed with the stroke sensor 20 and the target valve opening degree.

Furthermore, in a case where the stroke position of the magnetic movable body 7, which is sensed with the Hall IC of the stroke sensor 20, does not reach or approach the target position upon elapsing of a predetermined time period, it may be determined that a failure of the rod 4 or any other component(s) of the electric actuator 200 (e.g., an inoperable state of the wastegate valve 1 or the rod 4) exists. That is, the failure diagnosis of the wastegate valve 1, the rod 4 or any other component(s) of the electric actuator 200 can be performed. In this way the OBD requirement can be met.

Furthermore, in the wastegate valve control apparatus of the present embodiment, the rod 4 is reciprocated in the stroke direction by the load (the full close direction load that rotates the wastegate valve 1 toward the close side, or the full open direction load that rotates the wastegate valve 1 toward the open side), which is exerted from the drive force (motor torque) of the electric motor M through the drive force transmission mechanism, which includes the speed reducing mechanism 201 including the three gears 16-18 (the speed reducing gear mechanism having the final gear 18 formed as the spur gear), and the cam-type converting mechanism 202 having the plate cam 21, the follower 23 and the pivot pin 24.

In this way, it is possible to change the relationship between the stroke position of the rod 4 of the electric actuator 200 and the rod thrust force, and thereby it is possible to limit the positional deviation in the stroke position of the rod 4 caused by the valve pressure P.

Second Embodiment

Figure 6B:
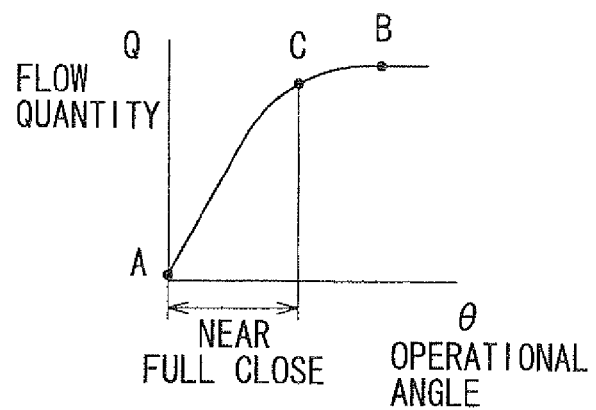
FIG. 6B is a graph showing characteristics of a flow quantity relative to an operational angle of a link lever according to a second embodiment of the present invention.
Figure 7:
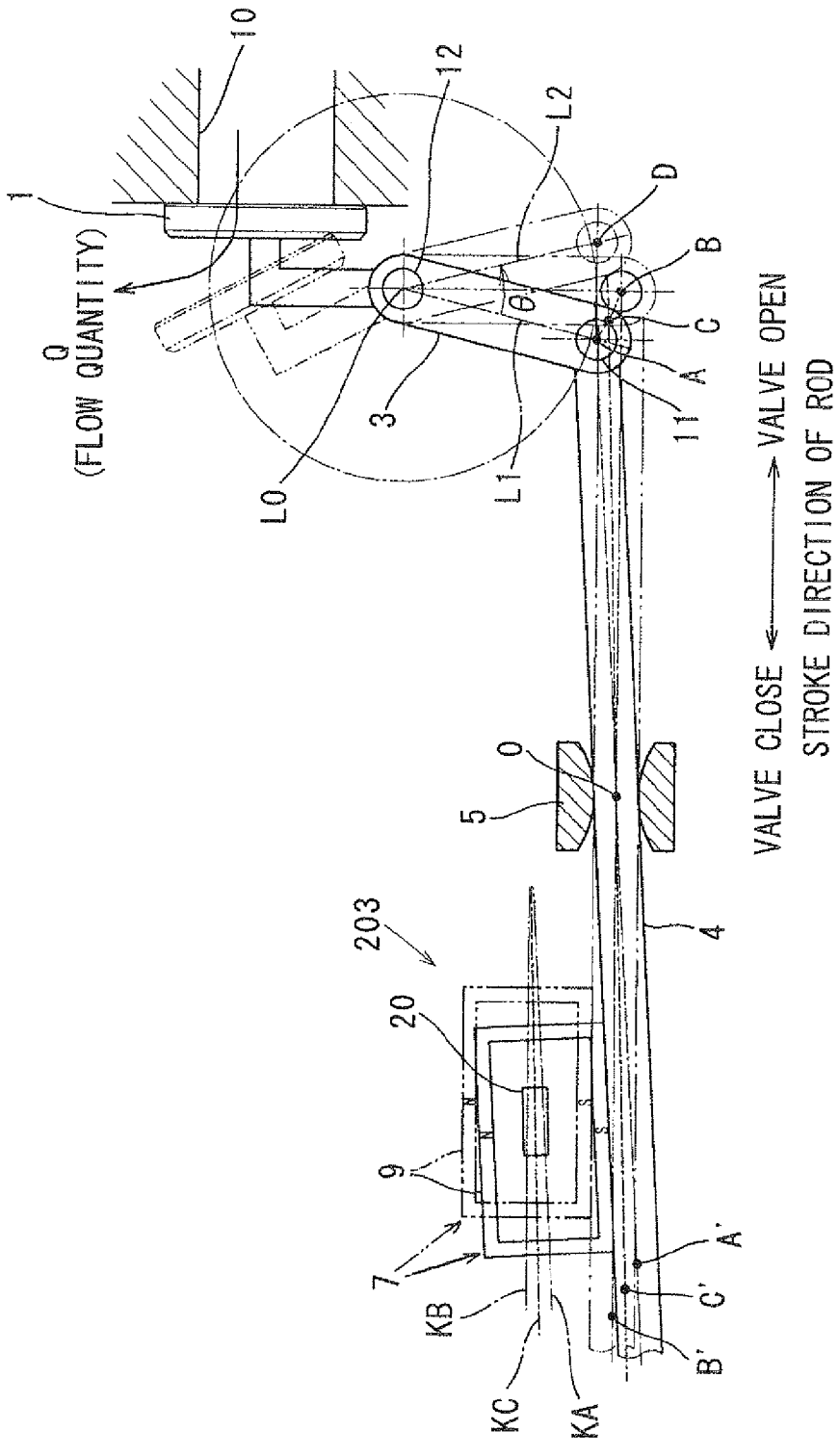
FIG. 7 is a descriptive view showing a relationship between a rod of an electric actuator and the link lever according to the second embodiment.

FIGS. 6B and 7 show a second embodiment of the present invention. Specifically, FIG. 6B shows a graph indicating characteristics of a flow quantity relative to an operational angle of the link lever. FIG. 7 is a schematic diagram showing a positional relationship of the connection between the rod of the electric actuator and the link lever. In the following description, the components, which are similar to those of the first embodiment, will be indicated by the same reference numerals and will not be described redundantly for the sake of simplicity.

The wastegate valve control apparatus of the present embodiment includes the wastegate valve 1, the electric actuator 200 and the ECU 400. The wastegate valve 1 is adapted to change the size of the open area of the wastegate passage 10 of the turbocharger. The electric actuator 200 controls the opening and closing of the wastegate valve 1 in response to the amount of displacement (the amount of stroke) of the rod 4 in the stroke direction of the rod 4. The ECU 400 controls the boost pressure of the engine by controlling the supply of the electric power to the electric motor M based on the operational state of the engine.

The wastegate valve 1 is the valve element of the exhaust gas flow quantity control valve, which controls the flow quantity of exhaust gas that flows through the wastegate passage 10 by changing the open area (exhaust gas flow passage cross-sectional area) of the wastegate passage 10.

In the wastegate valve control apparatus of the present embodiment, with reference to FIG. 7, the Hall IC, particularly the Hall element of the stroke sensor 20 is arranged as follows with respect to the magnetic movable body 7, which is the magnetic circuit made of the first and second magnets 8a, 8b and the magnetic frame 9.

Specifically, with reference to FIG. 7, the third imaginary line KC is now set as follows. That is, the third imaginary line KC is set to coincide with the center line MC of the first and second magnets 8a, 8b of the magnetic movable body 7 when the rotational moving point of the link lever 3 (the rod-side connection of the link lever 3 at the first hinge pin 11) is placed in a middle point C between the full close point A and the half point B along the rotational moving path of the link lever 3, i.e., is centered in the angular range between the full close point A and the half point B. In other words, the third imaginary line KC is centered in, i.e., bisects the angular range between the first imaginary line KA and the second imaginary line KB. Furthermore, the third imaginary line KC is generally parallel to an imaginary line, which connects between the middle point C and a point C', which is symmetric to the point C with respect to the bearing center O of the thrust bearing 5.

Now, a first characteristic of the second embodiment will be described. As discussed above, in addition to the first and second characteristics of the first embodiment, the wastegate valve control apparatus of the present embodiment is configured to have the following characteristic, i.e., the magnetic sensing surface 20a of the Hall IC, particularly the Hall element of the stroke sensor 20 is generally parallel to or generally coincides with the third imaginary line KC, which is centered in, i.e., bisects the angular range between the first imaginary line KA and the second imaginary line KB.

In this way, it is possible to reduce or minimize a change in the density of the magnetic flux (the strength of the magnetic field) relative to the magnetic sensing surface 20a of the Hall element in comparison to the comparative example of FIG. 6A (the positioning example where the magnetic sensing surface of the sensor 92 is placed to coincide with the center line of the magnetic circuit 91 that is placed in the rod straight state, i.e., in the non-tilted state of the rod 4).

Thus, it is possible to reduce or minimize the difference in the sensor output value of the Hall IC of the stroke sensor 20 caused by the difference in the amplitude of the swing of the rod 4, i.e., the amplitude of the swing of the magnetic movable body 7. Therefore, the sensing accuracy of the linear stroke position of the rod 4 can be improved, so that as discussed in the first characteristic of the first embodiment, the controllability of the amount of the stroke of the rod 4, i.e., the controllability of the opening degree of the wastegate valve 1 can be improved.

Now, a second characteristic of the second embodiment will be described. The wastegate valve 1 of the present embodiment is used as the valve element of the exhaust gas flow quantity control valve, which controls the flow quantity of exhaust gas that flows through the wastegate passage 10. In such an exhaust gas flow quantity control valve, as shown in FIG. 6B, it has been confirmed through experiments that a change rate of the exhaust gas flow quantity Q relative to the amount of movement of the rod 4 in a low opening degree range, which is located on a full close degree side (left side in FIG. 6B) of the middle opening degree (see the half point B in FIGS. 6B and 7) located between the full close degree (see the full close point A in FIGS. 6B and 7) and the full open degree (see the full open point D in FIG. 7) of the wastegate valve 1, is larger than a change rate of the exhaust gas flow quantity Q relative to the amount of movement of the rod 4 in a high opening degree range, which is located on a full open degree side (right side in FIG. 6B) of the middle opening degree (see the half point B in FIGS. 6B and 7).

Specifically, the exhaust gas flow quantity control valve, which includes the link mechanism 300 (e.g., the link lever 3) that converts the linear motion of the rod 4 of the electric actuator 200 into the rotational motion of the wastegate valve 1, has the following flow quantity characteristics. That is, the change rate of the exhaust gas flow quantity (pressure) relative to the amount of displacement of the rod 4, i.e., the lever operational angle θ of the link mechanism 300 becomes steeper in the low opening degree range of the valve element thereof, i.e., the wastegate valve 1 in comparison to the high opening degree range of the valve element thereof, i.e., the wastegate valve 1.

Therefore, in order to improve the sensing accuracy of the stroke sensor 20 and the controllability of the rod 4 by minimizing the amount of swing of the rod 4 in the low opening degree range where the change rate of the exhaust gas flow quantity (pressure) relative to the amount of displacement of the rod 4 is large, the magnetic sensing surface 20a of the Hall IC, particularly the Hall element of the stroke sensor 20 is generally parallel to or generally coincides with the third imaginary line KC, which is centered in, i.e., bisects the angular range between the first imaginary line KA and the second imaginary line KB, as discussed in the description of the first characteristic of the second embodiment. In such a case, the amount of swing of the rod 4 (the amplitude of swing of the rod 4 per unit rotational angle of the link lever 3) can be minimized in the low opening degree range where the change rate of the exhaust gas flow quantity (pressure) relative to the amount of displacement of the rod 4 is large. Therefore, it is possible to improve the sensing accuracy of the amount of stroke of the rod 4, which is sensed with the stroke sensor 20, and to improve the controllability of the amount of stroke of the rod 4.

Figure 6C:
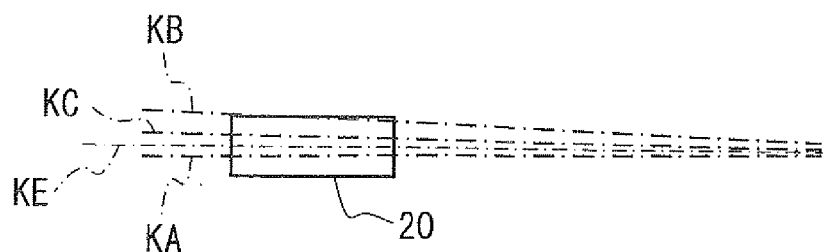
FIG. 6C is a schematic diagram showing a location of the sensor in a modification of the second embodiment.

Here, alternative to the first characteristic of the second embodiment, the magnetic sensing surface 20a of the Hall IC, particularly the Hall element of the stroke sensor 20 may be generally parallel to or generally coincide with a fourth imaginary line KE, which is an imaginary straight line that extends through the node X and is located within an angular range between the first imaginary line KA and the third imaginary line KC, as shown in FIG. 6C.

Here, the fourth imaginary line KE is a center line, which is centered in, i.e., bisects an angular range (intersecting angle) between the first imaginary line KA and the third imaginary line KC.

With the above settings, the change of the magnetic flux (the strength of the magnetic field) relative to the magnetic sensing surface 20a of the Hall element can be reduced or minimized within the operational range of the low opening degree (the lever operational range between the point A and the point C) where the change in the exhaust gas flow quantity is steep.

Furthermore, as a modification of the second characteristic of the second embodiment, the magnetic sensing surface 20a of the Hall element may be generally parallel to or generally coincide with the first imaginary line KA. In such a case, the change of the magnetic flux (the strength of the magnetic field) relative to the magnetic sensing surface 20a of the Hall element can be reduced or minimized within the operational range near the full close position (the lever operational range between the point A and the point C) where the change of the exhaust gas flow quantity is steep.

In this way, it is possible to reduce or minimize the difference in the sensor output value of the Hall IC of the stroke sensor 20 caused by the difference in the amplitude of swing of the rod 4, i.e., the amplitude of the swing of the magnetic movable body 7. Therefore, the sensing accuracy of the linear stroke position of the rod 4 can be improved. As a result, as discussed in the first characteristic of the first embodiment, the controllability of the amount of stroke of the rod 4, i.e., the controllability of the opening degree of the wastegate valve can be improved.

Third Embodiment

Figure 8:
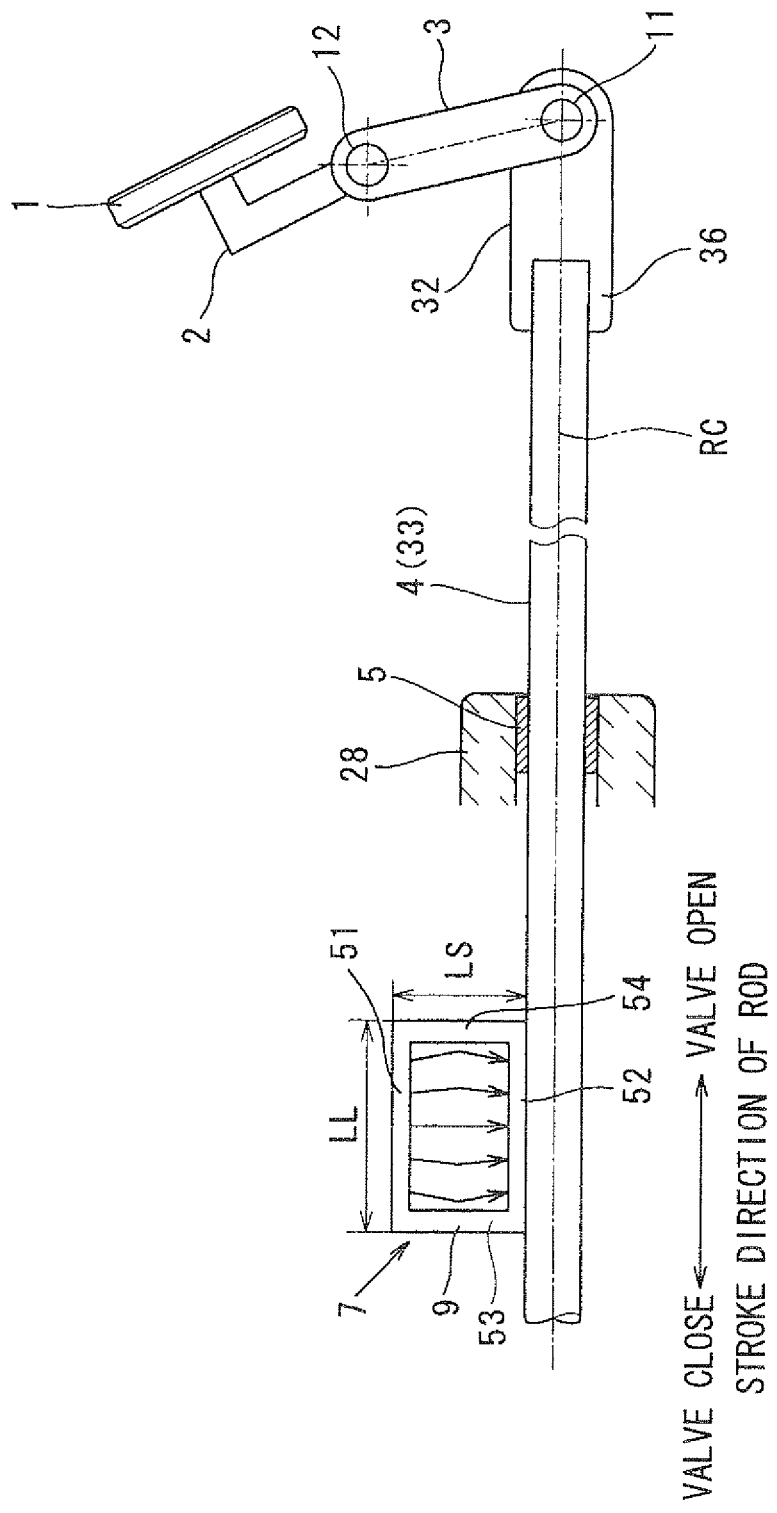
FIG. 8 is a descriptive view showing a relationship between a rod of an electric actuator and a link lever according to a third embodiment of the present invention.

FIG. 8 shows a third embodiment of the present invention. More specifically, FIG. 8 shows a positional relationship between the rod of the electric actuator and the link lever. In the following description, the components, which are similar to those of the first embodiment, will be indicated by the same reference numerals and will not be described redundantly for the sake of simplicity.

The wastegate valve control apparatus of the present embodiment includes the wastegate valve 1, the link lever 3, the electric actuator 200, the rod stroke sensing device 203 and the ECU 400. The wastegate valve 1 opens and closes the wastegate passage 10 of the turbocharger. The link lever 3 is connected to the shaft 2 of the wastegate valve 1. The electric actuator 200 includes the rod 4, which is connected to the wastegate valve 1 through the link lever 3 to drive the same. The rod stroke sensing device 203 senses the stroke position of the rod 4 of the electric actuator 200. The ECU 400 variably controls the boost pressure of the engine by controlling the opening and closing of the wastegate valve 1 based on the operational state of the engine (particularly, the sensor output value, i.e., the measurement value of the boost pressure sensor).

The rod stroke sensing device 203 includes the magnetic movable body 7 and the stroke sensor 20. The magnetic movable body 7 is provided integrally with the rod 4 at the corresponding location of the rod 4, which is on the electric motor side of the thrust bearing 5 (the side opposite from the valve side). The stroke sensor 20 is placed in the middle of the magnetic circuit, which is formed by the magnetic movable body 7. Specifically, the stroke sensor 20 is placed in the sensor receiving space 9a of the magnetic frame 9. Furthermore, as discussed in the first embodiment, the ECU 400 is constructed to compute (sense) the linear stroke position of the rod 4 of the electric actuator 200 based on the sensor output value of the stroke sensor 20.

The magnetic movable body 7 includes the first and second magnets 8a, 8b and the magnetic frame 9. The magnetic frame 9 is configured such that the longitudinal size (length) of the blocks 51, 52 (the length LL measured in the direction of the rod central axis RC) is longer than the transverse size (length) of the blocks 53, 54 (the length LS measured in the direction perpendicular to the rod central axis RC). The magnetic movable body 7 is placed such that the longitudinal direction of the magnetic frame 9 generally coincides with the stroke direction of the rod 4 (the direction of the rod central axis).

As discussed above, in the wastegate valve control apparatus of the present embodiment, in addition to the first and second characteristics of the first embodiment, the longitudinal direction of the magnetic frame 9 of the magnetic movable body 7 generally coincides with the stroke direction of the rod 4 (the direction of the rod central axis).

In this way, the change of the magnetic flux (the change of the magnetic field), which is caused by the movement of the magnetic movable body 7 in the stroke direction in the inside space of the magnetic frame 9 (the sensor receiving space 9a), becomes moderate. Therefore, it is possible to limit the variation in the change of the magnetic flux (the change of the strength of the magnetic field), which is received by the magnetic sensing surface 20a of the Hall element of the stroke sensor 20, with respect to the variation in the positional relationship of the stroke sensor 20 relative to the first and second magnets 8a, 8b and the magnetic frame 9 of the magnetic movable body 7. In this way, it is possible to limit the variation in the sensing accuracy of the stroke position of the magnetic movable body 7, i.e., the sensing accuracy of the linear stroke position of the rod 4.

Fourth Embodiment

Figure 9:
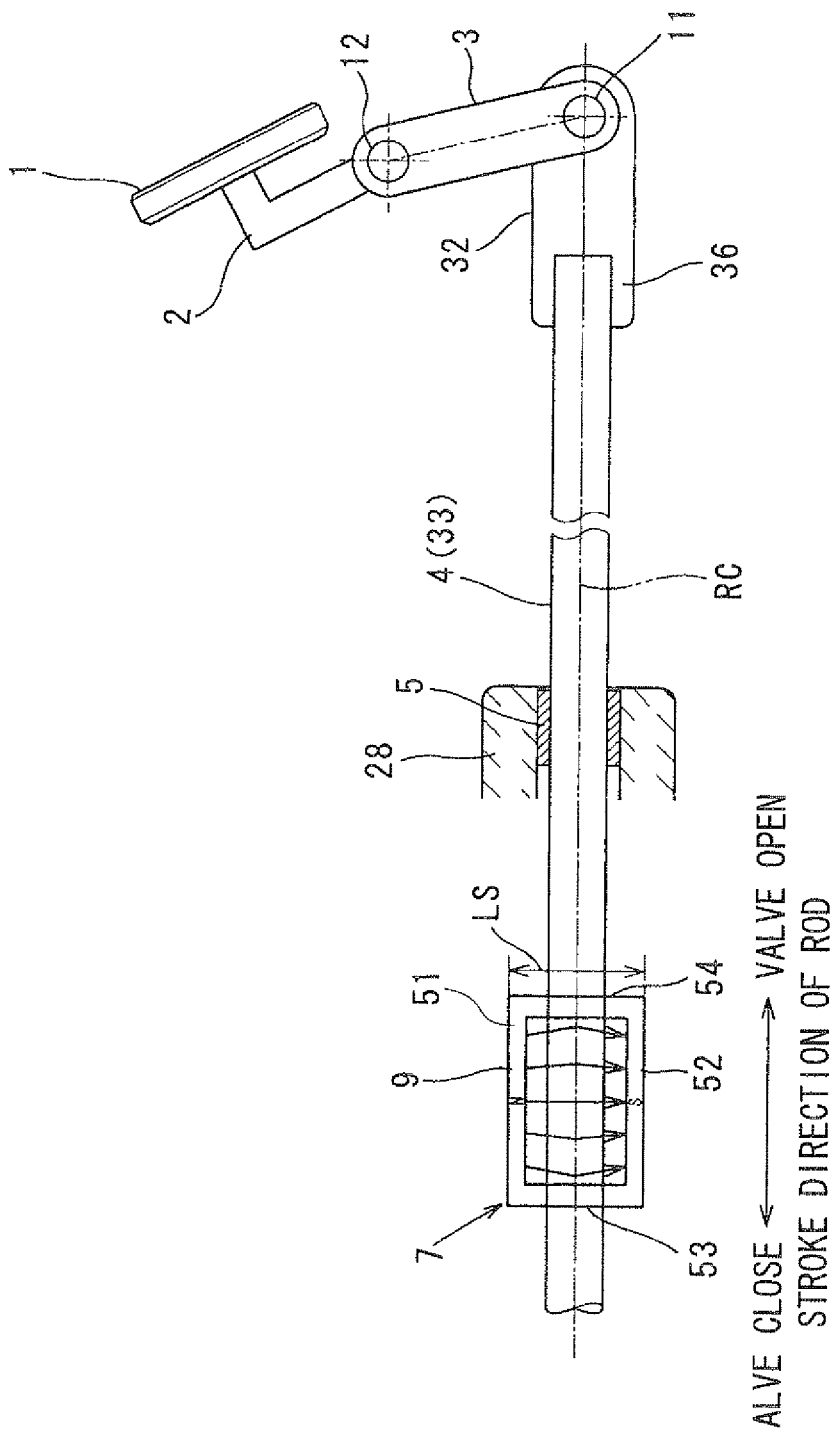
FIG. 9 is a descriptive view showing a relationship between a rod of an electric actuator and a link lever according to a fourth embodiment of the present invention.

FIG. 9 shows a fourth embodiment of the present invention. More specifically, FIG. 9 shows a positional relationship between the rod of the electric actuator and the link lever. In the following description, the components, which are similar to those of the first embodiment, will be indicated by the same reference numerals and will not be described redundantly for the sake of simplicity.

Similar to the first to third embodiments, the wastegate valve control apparatus of the present embodiment includes the wastegate valve 1, the link lever 3, the electric actuator 200 having the rod 4, the rod stroke sensing device 203 and the ECU 400.

Similar to the first to third embodiments, the rod stroke sensing device 203 includes the magnetic movable body 7 and the stroke sensor 20 with the Hall element. The magnetic movable body 7 has the first and second magnets 8a, 8b and the magnetic frame 9.

The magnetic movable body 7 is placed such that the magnetic movable body 7 is generally symmetric with respect to an imaginary plane, which includes the central axis (center line) of the rod 4 extending in the stroke direction of the rod 4 (direction of the rod central axis). That is, the magnetic movable body 7 (more specifically, the magnetic frame 9 provided with the first and second magnets 8a, 8b) is configured to have a plane-symmetric shape that is generally symmetric with respect to the imaginary plane, in which the central axis of the rod 4 is located.

As discussed above, in the wastegate valve control apparatus of the present embodiment, in addition to the first and second characteristics of the first embodiment, the magnetic movable body 7 is placed such that the magnetic movable body 7 is generally symmetric with respect to the imaginary plane, which includes the central axis of the rod 4 extending in the stroke direction of the rod 4.

Thus, it is possible to limit the variation in the change of the magnetic flux (the change of the strength of the magnetic field), which is received by the magnetic sensing surface 20a of the Hall element of the stroke sensor 20, with respect to the variation in the positional relationship between the magnetic movable body 7 (i.e., the first and second magnets 8a, 8b and the magnetic frame 9) and the stroke sensor 20. In this way, it is possible to limit the variation in the sensing accuracy of the stroke position of the magnetic movable body 7, i.e., the sensing accuracy of the linear stroke position of the rod 4.

Fifth Embodiment

Figure 10:
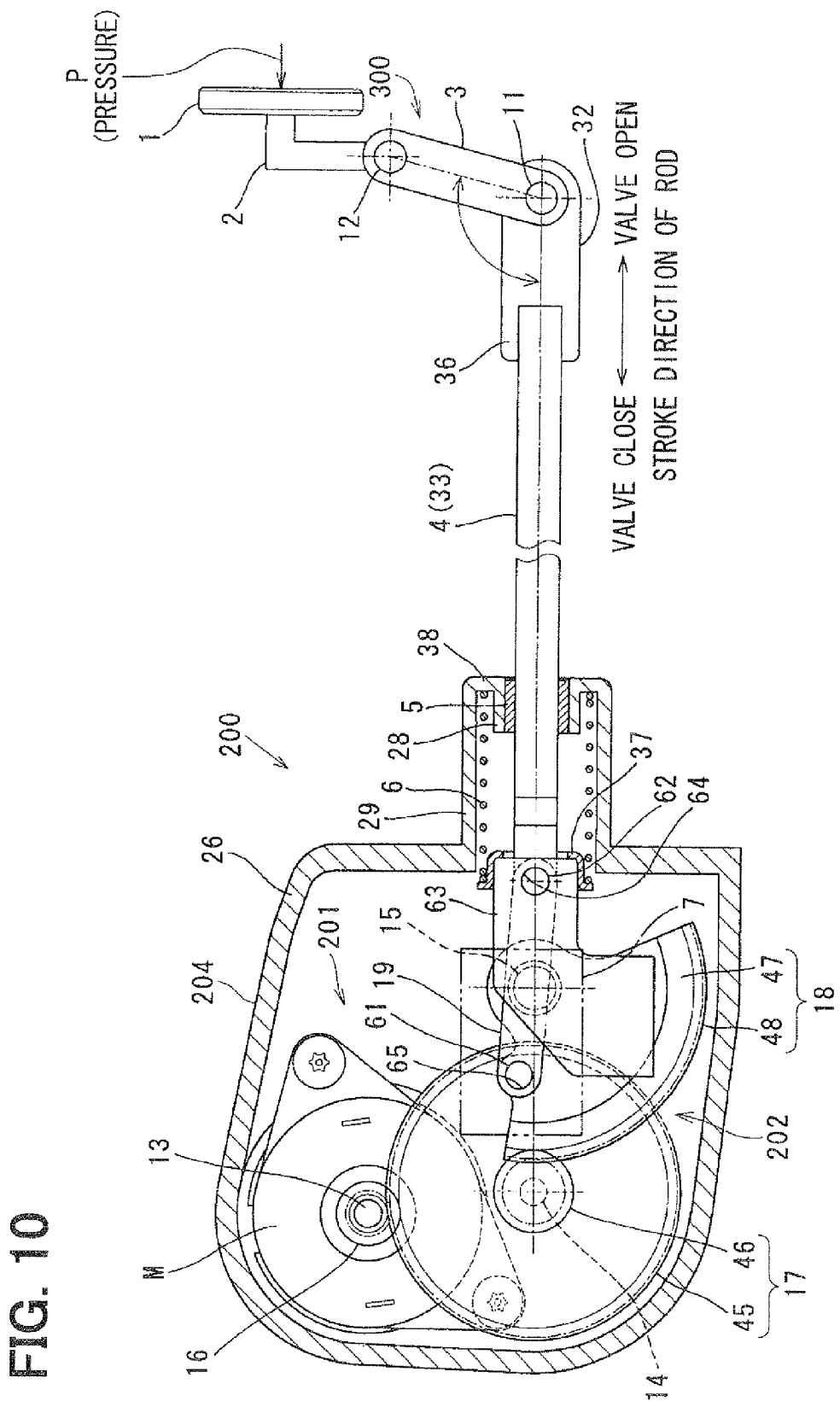
FIG. 10 is a descriptive view showing a wastegate valve control apparatus according to a fifth embodiment of the present invention.
Figure 11:
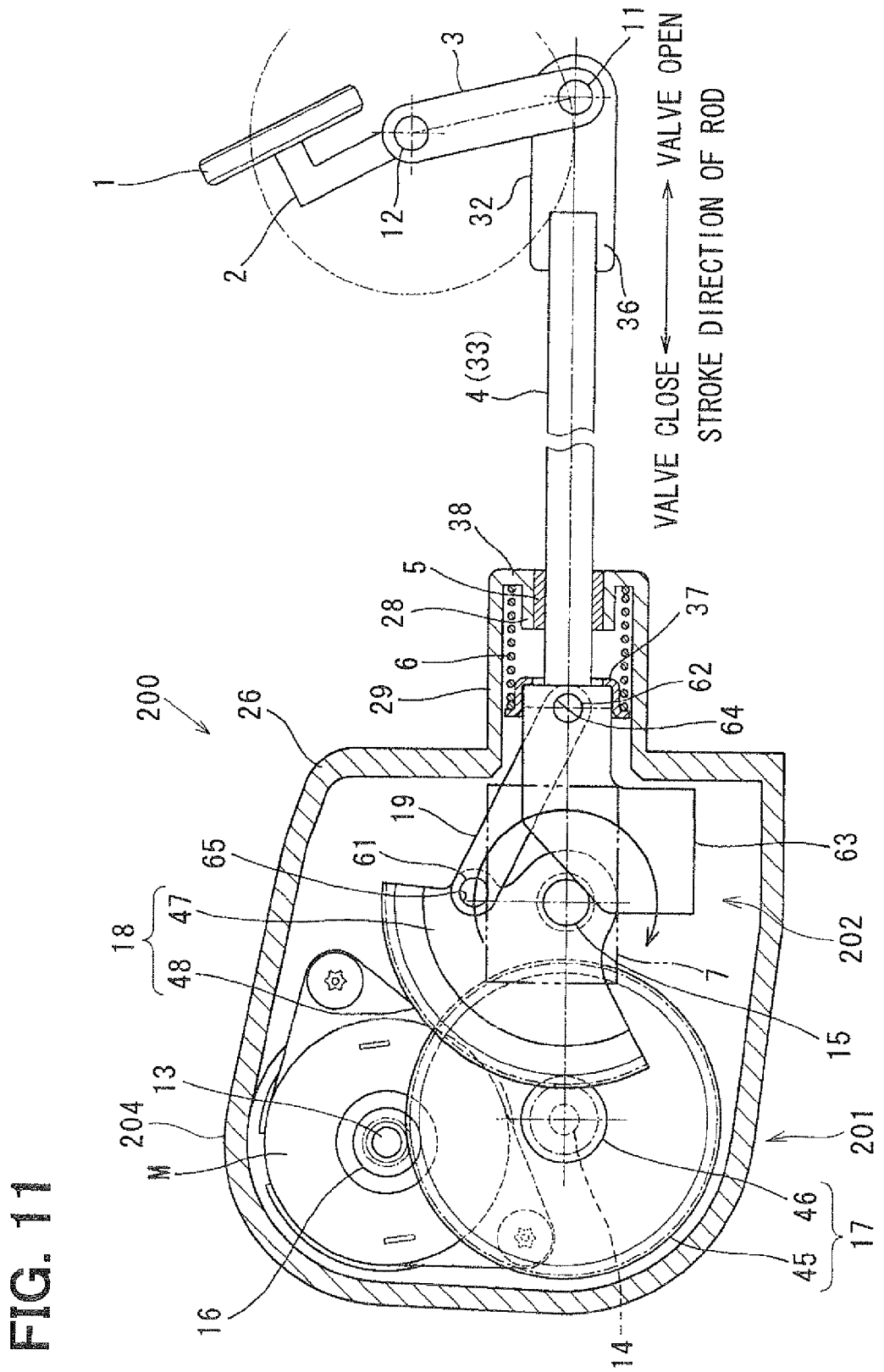
FIG. 11 is another descriptive view showing the wastegate valve control apparatus according to the fifth embodiment.

FIGS. 10 and 11 show the wastegate valve control apparatus according to a fifth embodiment of the present invention. In the following description, the components, which are similar to those of the first embodiment, will be indicated by the same reference numerals and will not be described redundantly for the sake of simplicity.

Similar to the first to fourth embodiments, the wastegate valve control apparatus of the present embodiment includes the electric actuator 200 that includes the rod 4, which is connected to the wastegate valve 1 through the link lever 3 to drive the wastegate valve 1. Besides the rod 4, the electric actuator 200 further includes the thrust bearing 5, the coil spring 6, the electric motor M (serving as the drive source), the speed reducing mechanism 201, the converting mechanism 202, the rod stroke sensing device 203 (the magnetic movable body 7 and the stroke sensor 20) and the actuator case 204. The speed reducing mechanism 201 reduces the rotational speed of the rotation, which is transmitted from the electric motor M, through two stages. The converting mechanism 202 converts the rotational motion of the speed reducing mechanism 201 into the corresponding linear motion of the rod 4. The actuator case 204 receives the above components of the electric actuator 200.

A fitting hole (not shown), which receives a first pivot pin (or simply referred to as a first pivot) 61, is formed on a surface of the final gear 18 of the speed reducing mechanism 201. The first pivot pin 61 rotatably supports a link lever 19 of the converting mechanism 202.

A guide plate 63 is connected to the rod 4 of the electric actuator 200 through a second pivot pin (or simply referred to as a second pivot) 62. The rod 4 includes the driven-side rod 32 and the connecting rod 33. The driven-side rod 32 is configured into the plate form (planar form) and is connected to the shaft 2 of the wastegate valve 1 through the link mechanism 300 (e.g., the link lever 3). The connecting rod 33 has the circular cross section and is connected to the guide plate 63 through the second pivot pin 62. The driven-side rod 32 and the connecting rod 33 are made of the metal material (non-magnetic material), such as stainless steel, and are joined together by, for example, welding to form a single-piece component.

One end part of the driven-side rod 32 (the end part located on the connecting rod 33 side) is connected to the connecting rod 33 by welding.

A fitting hole (not shown) is formed in the other end part of the driven-side rod 32, which is opposite from the connecting rod 33, and the first hinge pin 11 is fitted into this fitting hole.

A planar surface portion is formed in one end part of the connecting rod 33 (the end part opposite from the driven-side rod 32). A fitting hole (not shown), which receive the second pivot pin 62, extends through this planar surface portion in a plate thickness direction (a direction perpendicular to a plane of the planar surface portion). The connecting rod 33 is slidably supported by the thrust bearing 5.

The guide plate 63 has a fitting hole 64, which receives the second pivot pin 62, at an overlapping portion where the planar surface portion of the connecting rod 33 and the guide plate 63 overlap with each other. The magnetic movable body 7 is fixed integrally to the magnetic movable body mount surface of the guide plate 63 by the mold forming or the screws. The stroke sensor 20 is mounted to the sensor cover 27.

Similar to the first to fourth embodiments, the speed reducing mechanism 201 of the present embodiment includes the pinion gear 16, the intermediate gear 17 and the final gear 18. The central axis of the intermediate gear shaft 14 forms the rotational center (rotational axis) of the intermediate gear 17. Furthermore, the central axis of the final gear shaft 15 forms the rotational center (rotational axis) of the final gear 18.

The converting mechanism 202 of the present embodiment includes the link lever 19, which has the one end part connected to the final gear 18 and the other end part connected to the connecting rod 33.

Here, the first pivot pin 61 is fixed into the fitting hole of the final gear 18 (or is formed integrally with the final gear 18) such that the first pivot pin 61 projects from the fitting hole of the final gear 18 from the front surface of the final gear 18.

The second pivot pin 62, which projects in the same direction as that of the first pivot pin 61, is formed integrally with the rod 4 or is fixed into the fitting hole of the rod 4.

The first pin receiving hole 65 is formed to extend through the one end part of the link lever 19 such that the first pivot pin 61 is received through the first pin receiving hole 65. A second pin receiving hole (not shown) is formed to extend through the other end part of the link lever 19 such that the second pivot pin 62 is received through the second pin receiving hole. The link lever 19 is rotatably supported by an outer peripheral surface of the first pivot pin 61. Furthermore, the link lever 19 is rotatably supported by an outer peripheral surface of the second pivot pin 62.

As discussed above, in the wastegate valve control apparatus of the present embodiment, the rod 4 is reciprocated in the stroke direction by the load (the full close direction load, which rotates the wastegate valve 1 toward the close side, or the full open direction load, which rotates the wastegate valve 1 toward the open side) that is exerted by the drive force (motor torque) of the electric motor M through the drive force transmission mechanism. The drive force transmission mechanism includes the speed reducing mechanism 201 (the speed reducing gear mechanism having the final gear 18 formed as the spur gear) including the three gears 16-18 and the first pivot pin 61, and the converting mechanism 202 having the link lever 19.

In this way, it is possible to change the relationship between the stroke position of the rod 4 of the electric actuator 200 and the rod thrust force, and thereby it is possible to limit the positional deviation of the stroke position of the rod 4 caused by the valve pressure P.

Sixth Embodiment

Figure 12B:
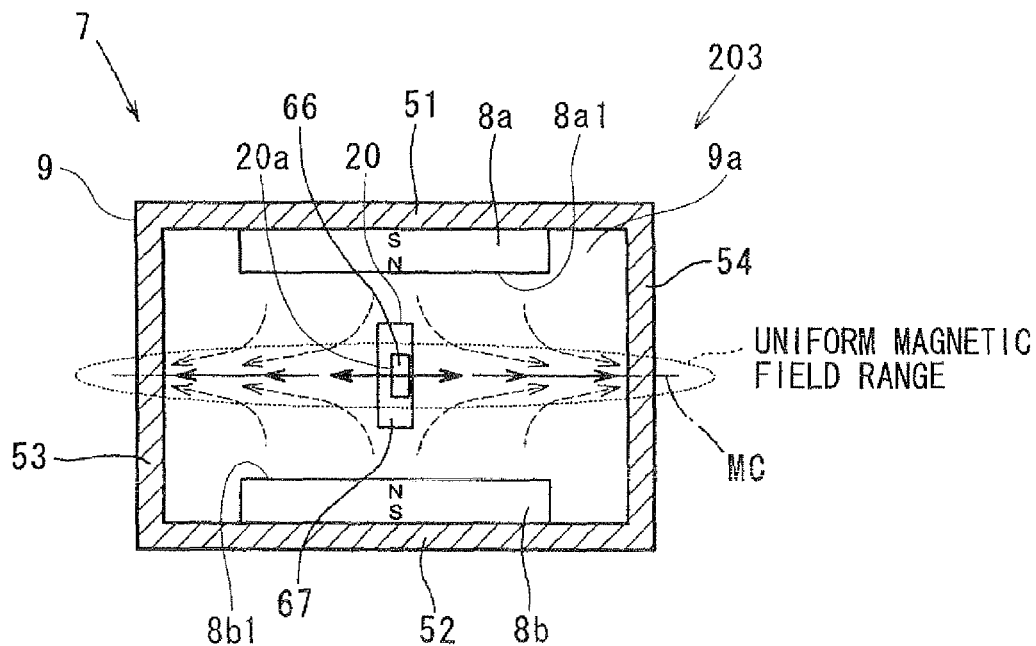

FIGS. 12A and 12B show the magnetic movable body (the magnetic circuit including the magnets and the magnetic frame) of a sixth embodiment, which is movable in the stroke direction of the rod relative to the stroke sensor. In the following description, the components, which are similar to those of the first embodiment, will be indicated by the same reference numerals and will not be described redundantly for the sake of simplicity.

Similar to the first to fifth embodiments, the wastegate valve control apparatus of the present embodiment includes the electric actuator 200 and the ECU 400. The electric actuator 200 includes the rod 4, which drives the wastegate valve 1 through the link lever 3. The ECU 400 controls the opening degree of the wastegate valve 1 based on the boost pressure, which is sensed with the boost pressure sensor.

Similar to the first to fifth embodiments, the electric actuator 200 includes the rod 4, the thrust bearing 5, the coil spring 6, the electric motor M, the speed reducing mechanism 201, the converting mechanism 202, the rod stroke sensing device 203 and the electric actuator 200.

Similar to the first to fifth embodiments, the rod stroke sensing device 203 of the present embodiment includes the magnetic movable body 7 and the stroke sensor 20.

The magnetic movable body 7 is provided integrally with (joined integrally with) the rod 4. As shown in FIGS. 12A and 12B, the magnetic movable body 7 includes the first and second magnets 8a, 8b and the magnetic frame (magnetic body) 9. Each of the first and second magnets 8a, 8b is configured into the rectangular parallelepiped form. The generally planar inner surface 8a1 of the first magnet 8a and the generally planar inner surface 8b1 of the second magnet 8b are directly opposed to each other in the sensor receiving space 9a of the magnetic frame 9. The first and second magnets 8a, 8b apply the magnetic flux to the stroke sensor 20. The magnetic frame 9 is configured into the elongated rectangular frame form (in the plan view) and concentrates the magnetic flux (magnetic field), which is generated by the first and second magnets 8a, 8b, onto the stroke sensor 20. The magnetic frame 9 is made of the magnetic material and includes the upper and lower blocks 51, 52 each configured into a rectangular parallelepiped form and the left and right blocks 53, 54 each configured into a rectangular parallelepiped form.

The first and second magnets 8a, 8b are provided integrally (bonded, fixed) to the inner surfaces, respectively, of the magnetic frame 9 and are exposed in the sensor receiving space 9a surrounded by the magnetic frame 9. The first and second magnets 8a, 8b are opposed to each other and are spaced from each other through a gap in the sensor receiving space 9a.

More specifically, the first magnet 8a is installed to the inner surface (the sensor receiving space side surface) of the block 51 of the magnetic frame 9. In the case of the first magnet 8a shown in FIG. 12A, one longitudinal end part (the left end part in FIG. 12A) of the first magnet 8a has the S-pole, and the other longitudinal end part (the right end part in FIG. 12A) of the first magnet 8a has the N-pole. Alternatively, in the case of the first magnet 8a shown in FIG. 12B, a pole surface, which extends throughout the planar inner surface 8a1 of the first magnet 8a, has the N-pole, and a pole surface, which extends throughout a planar outer surface of the first magnet 8a opposite from the planar inner surface 8a1, has the S-pole.

The second magnet 8b is installed to the inner surface (the sensor receiving space side surface, the opposing surface) of the block 52 (the block 52 being opposed to the block 51) of the magnetic frame 9. In the case of the second magnet 8b shown in FIG. 12A, one longitudinal end part (the left end part in FIG. 12A) of the second magnet 8b has the N-pole, and the other longitudinal end part (the right end part in FIG. 12A) of the second magnet 8b has the S-pole. Alternatively, in the case of the second magnet 8b shown in FIG. 12B, a pole surface, which extends throughout the planar inner surface 8b1 of the second magnet 8b has the N-pole, and a pole surface, which extends throughout a planar outer surface of the second magnet 8b opposite from the planar inner surface 8b1, has the S-pole.

Similar to the first to the fifth embodiments, the stroke sensor 20 includes the sensor chip (Hall element chip) 66, the lead frame (not shown) and the package 67. The sensor chip 66 includes the Hall element (the magnetic sensing element) and the voltage amplifier. The Hall element outputs the electrical signal (output voltage), which is proportional to the density of the magnetic flux generated by the first and second magnets 8a, 8b. The voltage amplifier outputs the amplified signal, which is generated by amplifying the output voltage of the Hall element. The lead frame is connected to electrode pads of the sensor chip 66. The package 67 is formed with the molding resin, which encapsulates the sensor chip 66 and the lead frame.

The sensor chip 66 is mounted to the surface of the lead frame through the dielectric bonding agent. The sensor chip 66 is received in the package 67.

In the case of FIG. 12A, the stroke sensor 20 is placed such that a transverse direction (perpendicular direction) of the package 67, which is perpendicular to the longitudinal direction of the package 67 and is perpendicular to the magnetic sensing surface 20a, coincides with a direction (a direction indicated by a bold double sided arrow in FIG. 12A), which is generally perpendicular to the stroke direction of the rod 4 (the direction of the center line MC between the first and second magnets 8a, 8b). In the case of FIG. 12B, the stroke sensor 20 is placed such that a longitudinal direction of the package 67 coincides with a direction (a direction perpendicular to a direction indicated by a bold double sided arrow in FIG. 12B), which is generally perpendicular to the stroke direction of the rod 4 (the direction of the center line MC between the magnets 8a, 8b). In other words, the transverse direction (perpendicular direction) of the package 67 is generally parallel to the stroke direction of the rod 4 in FIG. 12B.

The magnetic sensing surface 20a of the Hall element of the sensor chip (Hall element chip) 66 of the stroke sensor 20 senses the density of the magnetic flux outputted from the magnetic movable body 7, particularly the first and second magnets 8a, 8b.

In the wastegate valve control apparatus of the present embodiment, at least the portion of the magnetic sensing surface 20a of the Hall IC, particularly the Hall element of the stroke sensor 20 is placed in the angular range between the first imaginary line KA and the second imaginary line KB. Particularly, in the case of FIG. 12A, the magnetic sensing surface 20a is generally parallel to or generally coincides the third imaginary line KC, which is discussed in the first or second embodiment and extends through the node X within the angular range of between the first imaginary line KA and the second imaginary line KB. Therefore, the change in the magnetic flux in the direction perpendicular to the stroke direction of the rod 4 can be sensed with the Hall element of the stroke sensor 20.

In this way, as shown in FIG. 12A, the transverse direction of the package 67, which encapsulates the sensor chip (the Hall element chip) 66 with the resin, can be coincided with the direction that is generally perpendicular to the stroke direction of the rod 4. Thereby, the size (the size of the magnetic movable body 7) in the direction generally perpendicular to the stroke direction of the rod 4 can be reduced or minimized. The stroke direction of the rod 4 will not be influenced by the increase in the size in the longitudinal direction of the magnetic movable body 7.

In the case where the transverse direction of the package 67 coincides with the direction perpendicular to the stroke direction of the rod 4, and the magnetic sensing surface 20a of the Hall element of the stroke sensor 20 is generally parallel to or generally coincides with the third imaginary line KC like in the first to fifth embodiments, the distribution of the magnetic flux (density of the magnetic flux) formed around the Hall element of the stroke sensor 20 may possibly become non-uniform in some cases. Therefore, the change of the magnetic flux caused by the positional deviation between the magnetic movable body (the magnetic circuit) 7 and the magnetic sensing surface 20a of the Hall element may possibly become large, and thereby the sensing accuracy of the linear stroke position of the rod 4 may possibly be slightly deteriorated.

In contrast, in the wastegate valve control apparatus of the present embodiment shown in FIG. 12B, the magnetic sensing surface 20a of the Hall IC, particularly the Hall element of the Sensor chip 66 is generally perpendicular to the third imaginary line KC, which is discussed in the first or second embodiment and extends through the node X within the angular range between the first imaginary line KA and the second imaginary line KB. Therefore, it is possible to sense the change of the magnetic flux in the direction generally parallel to the stroke direction of the rod 4.

In this way, as shown in FIG. 12B, the longitudinal direction of the package 67, which encapsulates the sensor chip (the Hall element chip) 66 with the resin, can be coincided with the direction that is generally perpendicular to the stroke direction of the rod 4. Thus, the distribution of the magnetic flux (density), which is formed around the Hall element of the stroke sensor 20 (in the uniform magnetic field range), may become more uniform. Thereby, the change of the magnetic flux caused by the positional deviation between the magnetic movable body 7 and the magnetic sensing surface 20a of the Hall element may become smaller. Thus, the sensing accuracy of the linear stroke position of the rod 4 may be improved.

In the case where the magnetic sensing surface 20a of the Hall element of the stroke sensor 20 is generally perpendicular to the third imaginary line KC discussed in the first or second embodiment, the longitudinal direction of the package 67 can be coincided with the direction generally perpendicular to the stroke direction of the rod 4. Thus, the size (the size of the magnetic movable body 7) in the direction generally perpendicular to the stroke direction of the rod 4 may possibly be increased, as shown in FIG. 12B.

Seventh Embodiment

Figure 13:
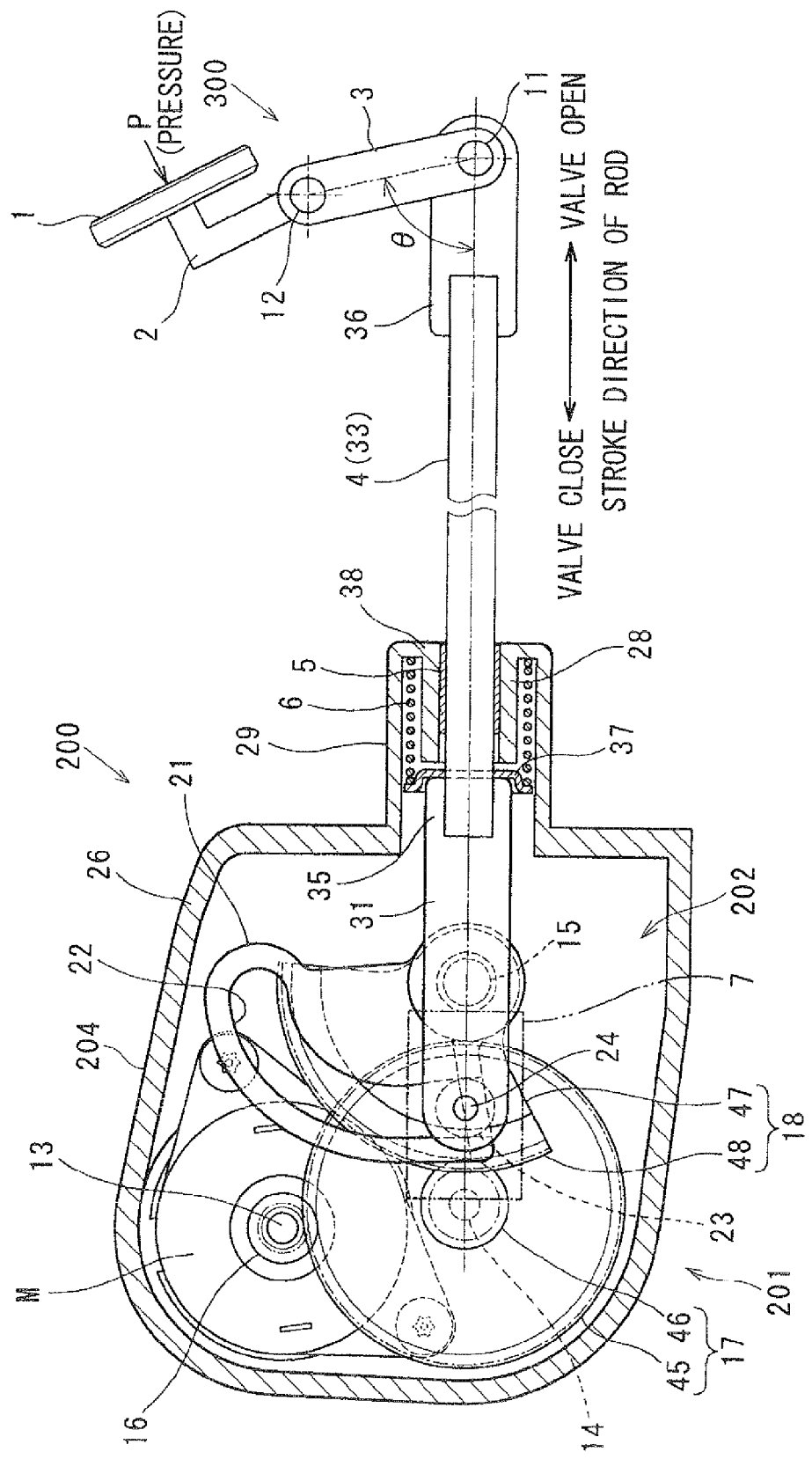
FIG. 13 is a descriptive view showing a wastegate valve control apparatus according to a seventh embodiment of the present invention.
Figure 14A:
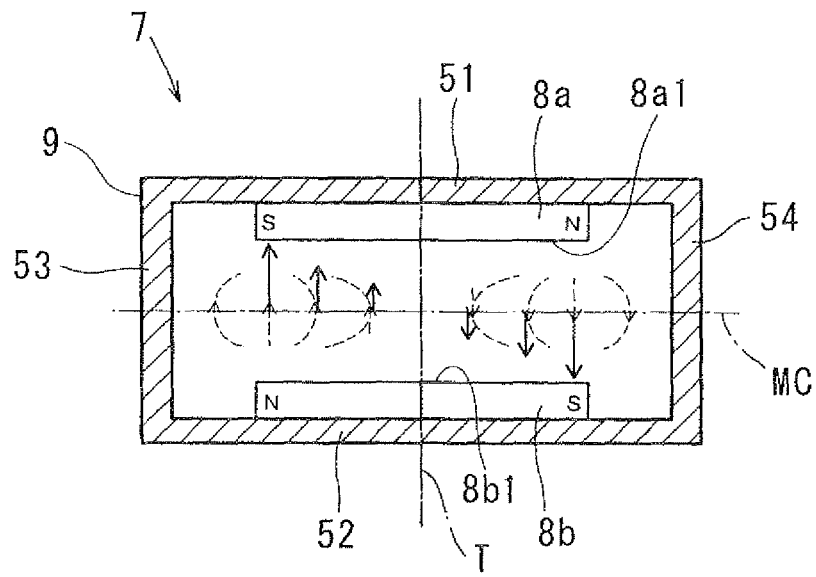
FIGS. 14A and 14B are schematic diagrams showing examples of a magnetic movable body, which includes first and second magnets and a magnetic frame configured into an elongated rectangular frame form according to the seventh embodiment.
Figure 14B:
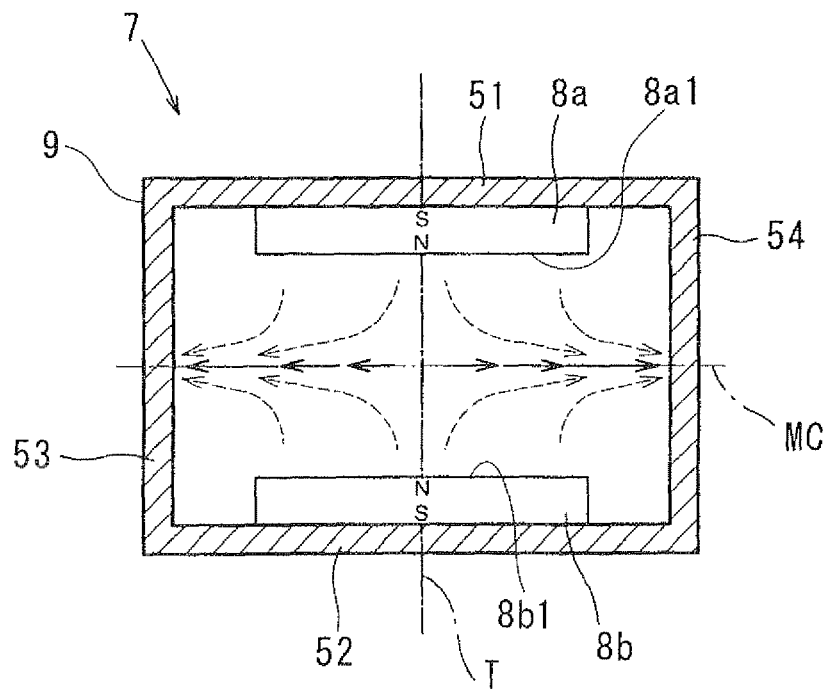
Figure 15A:
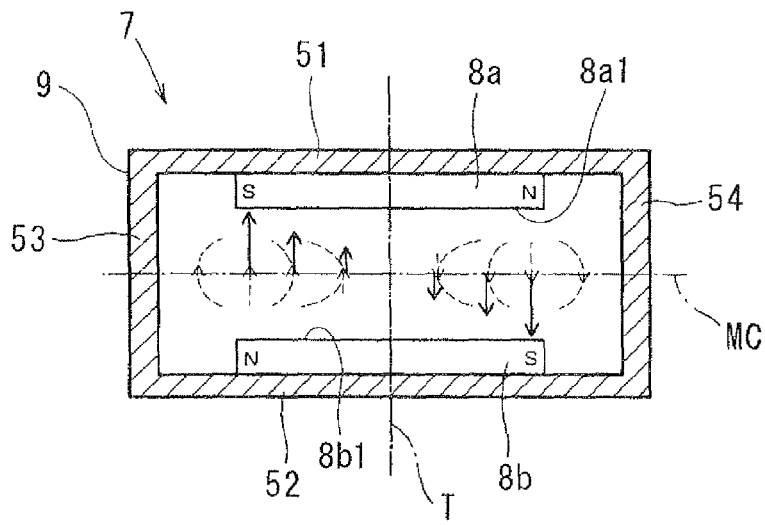
FIG. 15A is a schematic diagram showing a magnetic movable body, which includes first and second magnets and a magnetic frame configured into an elongated rectangular frame form according to the seventh embodiment.
Figure 15B:
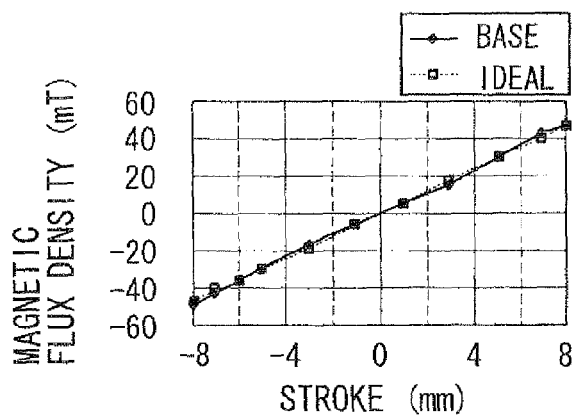
FIG. 15B is a diagram indicating an ideal characteristic line of a change of a density of a magnetic flux relative to a change of a stroke of a rod as well as a reference line (base) according to the seventh embodiment.
Figure 15C:
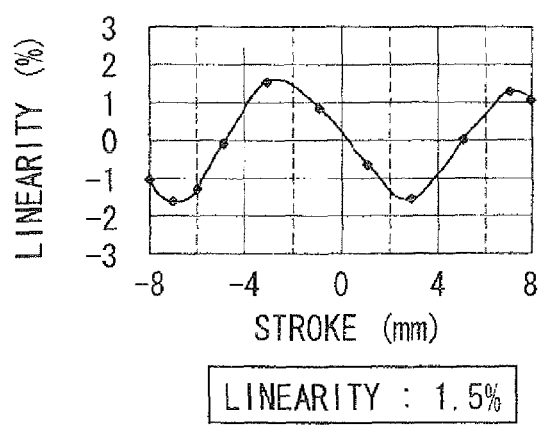
FIG. 15C is a diagram showing a linearity of a change of a magnetic flux relative to a change of a stroke of the rod according to the seventh embodiment.

FIGS. 13 to 15C indicate a seventh embodiment of the present invention. Specifically, FIG. 13 shows the wastegate valve control apparatus of the seventh embodiment. FIGS. 14A and 14B show the magnetic movable body, which includes the first and second magnets and the magnetic frame configured into the elongated rectangular frame form. FIG. 15A shows the magnetic movable body, which includes the first and second magnets and the magnetic frame configured into the elongated rectangular frame from. FIG. 15B shows an ideal characteristic line of the change of the density of the magnetic flux relative to the change of the stroke of the rod as well as a reference line (base). FIG. 15C shows a linearity of the change of the magnetic flux relative to the change of the stroke of the rod. In the following description, the components, which are similar to those of the first embodiment, will be indicated by the same reference numerals and will not be described redundantly for the sake of simplicity.

Similar to the first to fifth embodiments, the wastegate valve control apparatus of the present embodiment includes the electric actuator 200 and the ECU 400. The electric actuator 200 includes the rod 4, which drives the wastegate valve 1 through the link lever 3. The ECU 400 controls the opening degree of the wastegate valve 1 based on the boost pressure, which is sensed with the boost pressure sensor.

Similar to the first to fifth embodiments, the electric actuator 200 includes the rod 4, the thrust bearing 5, the coil spring 6, the electric motor M, the speed reducing mechanism 201, the converting mechanism 202, the rod stroke sensing device 203 and the actuator case 204.

The converting mechanism 202 of the present embodiment is the motion direction converting mechanism 202, which converts the rotational motion of the final gear 18 into the linear motion of the rod 4. Similar to the first to fifth embodiments, the converting mechanism 202 includes the plate cam 21, the follower 23 and the pivot pin 24. The plate cam 21 is rotatable integrally with the final gear 18. The follower 23 is movably (slidably) received in the cam groove 22 of the plate cam 21. The pivot pin 24 rotatably supports the follower 23.

The follower 23 of the present embodiment is made of a magnetic material (e.g., iron, nickel, ferrite) and is configured into the cylindrical tubular form. The follower 23 is rotatably fitted to the outer peripheral surface of the pivot pin 24, which is securely press-fitted to the rod 4. The follower 23 includes a cylindrical tubular portion, which surrounds the pivot pin 24 in a circumferential direction. A rotational center of the follower 23 and a rotational center of the plate cam 21 are located along the central axis of the rod 4, i.e., the rod central axis RC.

Similar to the sixth embodiment, the rod stroke sensing device 203 of the present embodiment includes the magnetic movable body 7 and the stroke sensor 20.

As shown in FIG. 13, the magnetic movable body 7 is provided integrally with (joined integrally with) the rod 4 to overlap with the rod 4 in the axial direction of the follower 23 and the pivot pin 24.

Figure 16A:
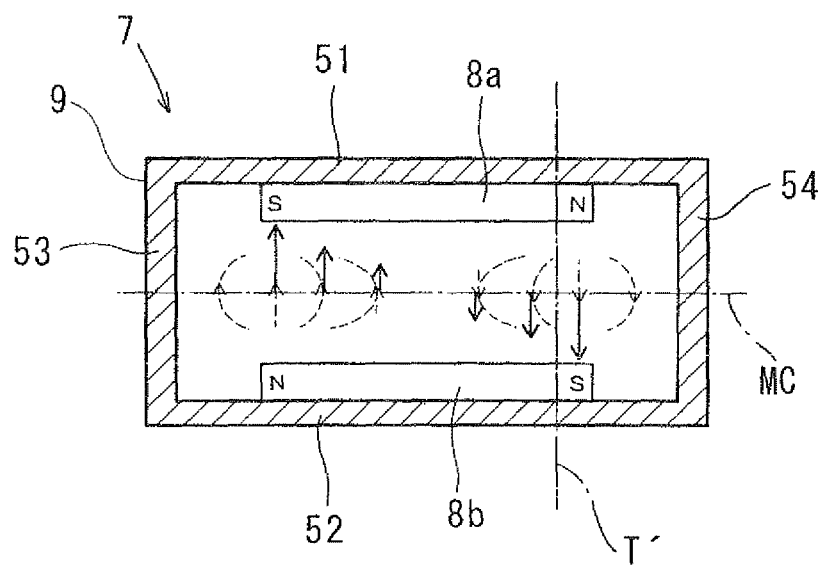
FIG. 16A is a schematic diagram showing a magnetic movable body, which includes first and second magnets and a magnetic frame configured into an elongated rectangular frame form, in a first comparative example.
Figure 16B:
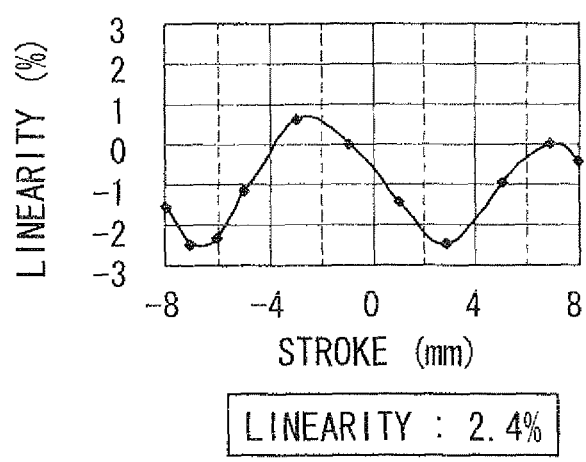
FIG. 16B is a diagram showing a linearity of change of a density of a magnetic flux relative to a change of a stroke of a rod in the first comparative example.
Figure 18:
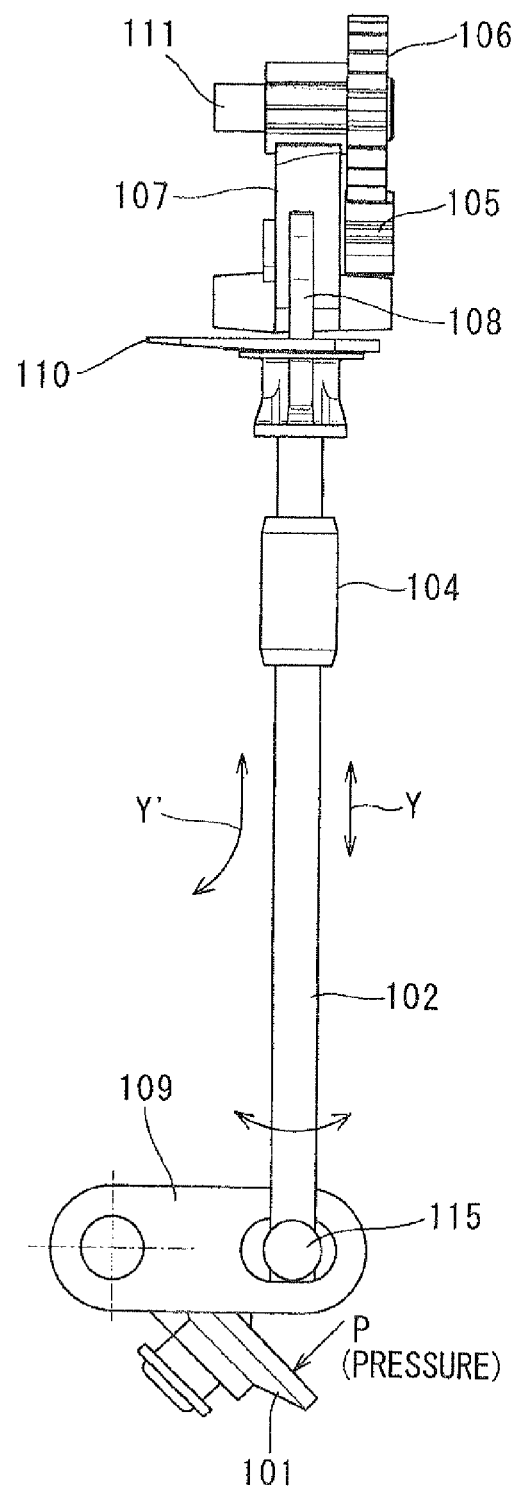
FIG. 18 is a descriptive view showing a relationship between the rod of the electric actuator and the link lever in the first prior art.
Figure 19A:
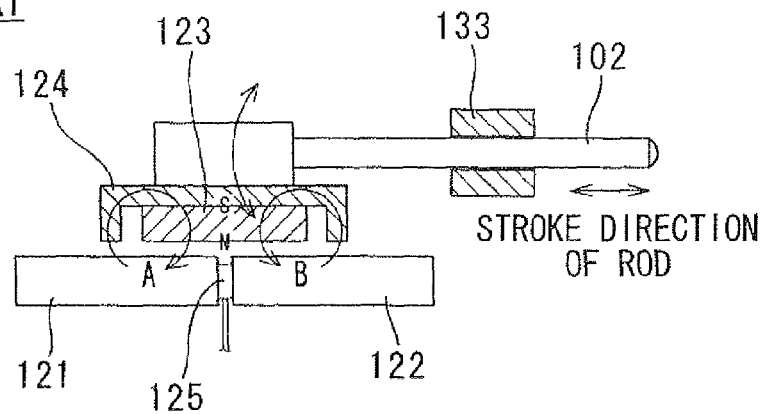
FIGS. 19A to 19C are descriptive diagrams showing a rod stroke position sensing device of a second prior art.
Figure 19B:
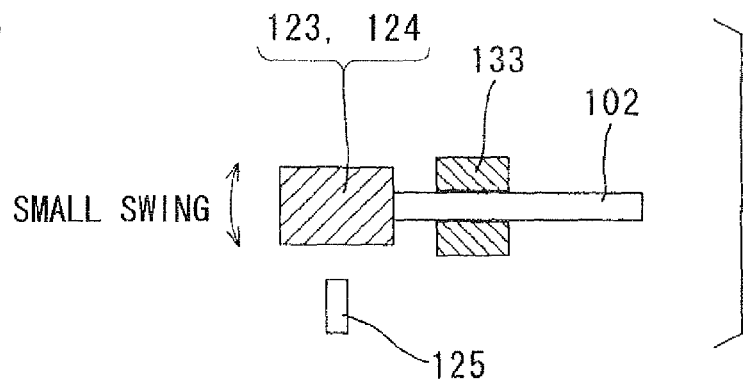
Figure 19C:
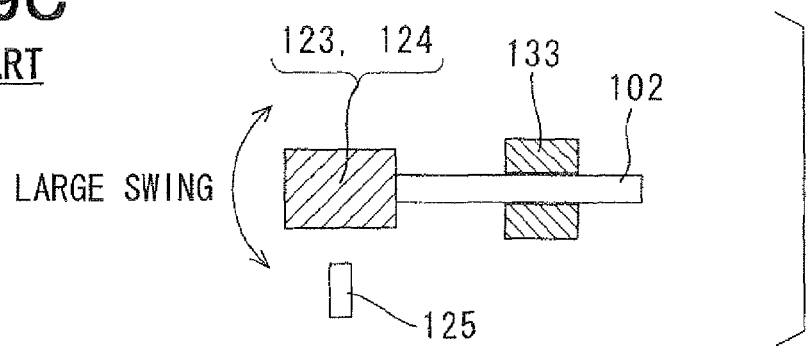

In the case where the follower 23 of the first embodiment is made of the magnetic material like in the present embodiment, an imaginary straight line T', which indicates a moving path of the follower 23 at the time of moving the rod 4 in the stroke direction, is located at the right side of the magnetic movable body 7 and extends linearly in the top-to-bottom direction as indicated in FIG. 16A. The follower 23 moves along the imaginary straight line 1". In this case, the change of the density of the magnetic flux, which is outputted from the pole surfaces of the first and second magnets 8a, 8b toward the stroke sensor 20, relative to the change of the stroke position of the rod 4, is deviated from the ideal characteristic line, which is determined based on, for example, the result of experiments in advance. Specifically, as shown in FIG. 16B, the linearly of the change of the density of the magnetic flux relative to the change of the stroke of the rod 4 is in a range of ±2.4%.

This is due to the following reason. That is, the magnetic flux, which is outputted from the pole surfaces of the first and second magnets 8a, 8b toward the stroke sensor 20, is absorbed by the follower 23 made of the magnetic material, so that the linearly of the change of the density of the magnetic flux relative to the change of the stroke of the rod 4 is deteriorated.

In view of the above point, according to the present embodiment, the moving path of the follower 23, along which the follower 23 is moved at the time of moving the rod 4 in the stroke direction, is set to pass a location, at which the magnetic flux generated by the first and second magnets 8a, 8b does not pass through the magnetic sensing surface 20a of the Hall element of the stroke sensor 20 to result in zero (0 mT) as the density of the magnetic flux sensed with the Hall element of the stroke sensor 20, i.e., a point, at which the density of the magnetic flux sensed with the Hall element of the stroke sensor 20 in the stroke location of the rod 4 becomes zero. Furthermore, the moving path of the follower 23, along which the follower 23 is moved at the time of moving the rod 4 in the stroke direction, passes along the imaginary straight line T, which extends in the direction generally perpendicular to the stroke direction of the rod 4.

Thereby, the magnetic flux, which is outputted from the pole surfaces of the first and second magnets 8a, 8b of the magnetic movable body 7 toward the stroke sensor 20, is limited from being absorbed by the follower 23 made of the magnetic material. Therefore, the sensing accuracy of the linear stroke position of the rod 4 can be further improved.

In the present embodiment, as indicated in FIG. 15A, the imaginary straight line T passes through a longitudinal center of the magnetic movable body 7 and extends in the top-to-bottom direction in FIG. 15A. The follower 23 moves along the imaginary straight line T. In this case, the change of the density of the magnetic flux, which is outputted from the pole surfaces of the first and second magnets 8a, 8b, relative to the change of the stroke position of the rod 4, generally coincides with the ideal characteristic line, which is determined based on, for example, the result of experiments in advance, as shown in FIG. 15B. Specifically, as shown in FIG. 15C, the linearly of the change of the density of the magnetic flux relative to the change of the stroke of the rod 4 is in a range of ±1.5%. In this way, the sensor output value of the stroke sensor 20, which varies in proportional to the density of the magnetic flux, shows the high linearity, so that the sensing accuracy of the linear stroke position of the rod 4 can be improved.

Now, modifications of the above embodiments will be described.

In the above embodiments, the valve control apparatus of the present invention is implemented as the wastegate valve control apparatus, which controls the electric actuator 200 that drives the wastegate valve 1. Alternatively, the valve control apparatus of the present invention may be implemented as a valve control apparatus, which controls an electric actuator that drives a valve element (valve) of an exhaust gas temperature control valve, and this exhaust gas temperature control valve controls (adjusts) a ratio between a quantity of exhaust gas recirculation (EGR) gas, which passes through an EGR cooler, and a quantity of EGR gas, which bypasses the EGR cooler.

In the above embodiments, the actuator is the electric actuator 200 used to drive the wastegate valve 1 by reciprocating the rod 4, which is connected to the wastegate valve 1 through the link lever 3, in the axial direction (the stroke direction) through use of the drive force of the electric motor M. Alternatively, this actuator may be replaced with a solenoid actuator or a hydraulic actuator, which uses an electromagnetic force or a hydraulic force to reciprocate a rod connected to the valve through a lever in an axial direction (stroke direction).

Furthermore, the engine is not limited to the diesel engine. That is, the engine may be a gasoline engine, if desired.

Furthermore, the polarity of each pole of the magnets (first and second magnets 8a, 8b) of the magnetic movable body 7 is not limited to the above described ones discussed in the first to seventh embodiments. Also, the shape of each of the magnets and the number of the magnets are not limited to the above described ones discussed in the first to seventh embodiments.

In FIG. 12B, the magnetic sensing surface 20a is generally perpendicular to the third imaginary line KC, which is discussed in the first or second embodiment. Alternatively, when the magnetic sensing surface 20a is oriented in the manner discussed with reference to FIG. 12B, the magnetic sensing surface 20a may be generally perpendicular to any other imaginary line located between the first imaginary line KA and the second imaginary line KB as long as at least a portion of the magnetic sensing surface 20a is located within the angular range between the first imaginary line KA and the second imaginary line KB. Alternatively, the magnetic sensing surface 20a may be generally perpendicular to the first imaginary line KA or the fourth imaginary line KE in the case where the magnetic sensing surface 20a is oriented in the manner discussed with reference to FIG. 12B.

Additional advantages and modifications will readily occur to those skilled in the art. The invention in its broader terms is therefore not limited to the specific details, representative apparatus, and illustrative examples shown and described.

What is claimed is:

1. A valve control apparatus comprising:
a valve that is adapted to rotate about a rotational axis of the valve;
an actuator that includes a rod and drives the rod to reciprocate the rod in an axial direction of the rod and thereby to drive the valve;
a link mechanism that includes a lever, which connects between the valve and the rod and converts linear motion of the rod into rotational motion of the valve;
a magnetic movable body that is installed integrally to the rod and includes first and second magnets, which cooperate with each other to generate a magnetic field having a generally constant density of a magnetic flux, wherein a central axis of the rod is generally parallel to a center line of the first and second magnets, which is generally parallel to and is centered between an inner surface of the first magnet and an inner surface of the second magnet that are opposed to each other;
a sensor that outputs an electric signal, which corresponds to the magnetic flux that changes in response to movement of the magnetic movable body relative to the sensor; and
means for sensing an amount of displacement of the rod in a stroke direction, which coincides with the axial direction of the rod, based on the electric signal outputted from the sensor, wherein:
the actuator is driven to control opening and closing of the valve based on the amount of displacement of the rod in the stroke direction of the rod sensed with the sensing means;
the actuator includes a rod bearing, which slidably supports the rod to enable slide motion of the rod in the stroke direction while enabling swing motion of the rod about the rod bearing;
the sensor includes a magnetic sensing surface, which is adapted to sense the magnetic flux of the magnetic movable body;
the lever includes a rotational axis, which is coaxial with the rotational axis of the valve, at a valve-side connection of the lever that is rotatably connected to the valve;
the fever includes a rod-side connection that is rotatably connected to the rod, wherein the rod-side connection is adapted to move along a rotational moving path, which is a curved path centered at the rotational axis of the valve-side connection of the lever and has a predetermined radius of curvature, when the valve is rotated through the rod;
when an opening degree of the valve becomes a full close degree to fully close the flow passage, a rotational moving point of the rod-side connection, which is moved along the rotational moving path, is placed in a full close point along the rotational moving path;
when the opening degree of the valve becomes a full open degree to fully open the flow passage, the rotational moving point of the rod-side connection, which moves along the rotational moving path, is placed in a full open point along the rotational moving path;
when the opening degree of the valve becomes a half degree, which is one half of an angular degree between the full close degree and the full open degree, the rotational moving point of the rod-side connection is placed in a half point between the full close point and the full open point along the rotational moving path; and
at least a portion of the magnetic sensing surface of the sensor is placed in an angular range between:
a first imaginary line, which coincides with the center line of the first and second magnets when the rotational moving point of the rod-side connection of the lever is placed in the full close point; and
a second imaginary line, which coincides with the center line of the first and second magnets when the rotational moving point of the rod-side connection of the lever is placed in the half point.

2. The valve control apparatus according to claim 1, wherein at least the portion of the magnetic sensing surface of the sensor is generally parallel to or perpendicular to a third imaginary line that is placed within the angular range between the first imaginary line and the second imaginary line and passes through a node, at which the first imaginary line and the second imaginary line intersect with each other.

3. The valve control apparatus according to claim 1, wherein the magnetic sensing surface of the sensor is entirely placed in the angular range between the first imaginary line and the second imaginary line.

4. The valve control apparatus according to claim 1, wherein the rotational moving path is an arcuate path, which connects between the full close point and the full open point and is centered at the rotational axis of the valve-side connection of the lever and has the predetermined radius of curvature.

5. The valve control apparatus according to claim 1, wherein the magnetic sensing surface of the sensor is generally parallel to or perpendicular to a third imaginary line, which is centered in the angular range between the first imaginary line and the second imaginary line and passes a node, at which the first imaginary line and the second imaginary line intersect with each other.

6. The valve control apparatus according to claim 1, wherein:
the valve is a flow quantity control valve; and
a rate of change in a flow quantity of fluid, which passes through an opening between the flow passage and the valve, relative to a change in the amount of displacement of the rod is larger in a range between the half degree and the full close degree of the valve in comparison to a range between the half degree and the full open degree.

7. The valve control apparatus according to claim 1, wherein:
when the opening degree of the valve becomes a middle degree, which is one half of an angular degree between the full close degree and the half degree, the rotational moving point of the rod-side connection is placed in a middle point between the full close point and the half point along the rotational moving path;
at least the portion of the magnetic sensing surface of the sensor is placed within an angular range between the first imaginary line and a third imaginary line, which coincides with the center line of the first and second magnets when the rotational moving point of the rod-side connection of the lever is placed in the middle point; and
at least the portion of the magnetic sensing surface of the sensor is placed generally parallel to or perpendicular to a fourth imaginary line that is placed within the angular range between the first imaginary line and the third imaginary line and passes a node, at which the first imaginary line and the third imaginary line intersect with each other.

8. The valve control apparatus according to claim 7, wherein the fourth imaginary line is centered between the first imagery line and the third imaginary line.

9. The valve control apparatus according to claim 1, wherein the magnetic sensing surface of the sensor is placed generally parallel to or perpendicular to the first imaginary line.

10. The valve control apparatus according to claim 1, wherein:
the magnetic movable body includes a magnetic body, which is configured into an elongated rectangular frame and is magnetized with the first and second magnets; and
a longitudinal direction of the magnetic body generally coincides with the stroke direction of the rod.

11. The valve control apparatus according to claim 1, wherein:
the rod includes an intermediate portion between the rod bearing and an end part of the rod, which is opposite from the rod-side connection in the axial direction; and
the magnetic movable body is installed integrally to the intermediate portion of the rod.

12. The valve control apparatus according to claim 1, wherein the magnetic movable body is configured into a plane-symmetric shape that is generally symmetric with respect to an imaginary plane, in which the central axis of the rod is located.

13. The valve control apparatus according to claim 1, wherein the actuator includes:
an electric motor that is rotated upon energization thereof;
a speed reducing mechanism that reduces a speed of rotation outputted from the electric motor; and
a converting mechanism that converts rotational motion of the speed reducing mechanism into the linear motion of the rod.

14. The valve control apparatus according to claim 13, wherein:
the speed reducing mechanism includes:
a driving-side gear that is rotated by the electric motor upon rotation of the electric motor;
a driven-side gear that is meshed with the driving-side gear and is driven by the driving-side gear;
the converting mechanism includes:
a cam that is rotated through rotation of the driven-side gear and has a cam groove, which is configured to correspond with a moving pattern of the valve; and
a follower that is movably received in the cam groove;
the rod includes a support shaft, which rotatably supports the follower;
one end part of the rod is connected to the cam through the follower and the support shaft; and
the other end part of the rod is connected to the valve.

15. The valve control apparatus according to claim 13, wherein:
the speed reducing mechanism includes:
a driving-side gear that is rotated by the electric motor upon rotation of the electric motor;
a driven-side gear that is meshed with the driving-side gear and is driven by the driving-side gear; and
a first pivot that projects outward from the driven-side gear; and
the converting mechanism includes:
a second pivot that is connected to the rod and projects in a common direction, which is common to a projecting direction of the first pivot; and
a link lever that has one end part, which is rotatably supported by the first pivot, and the other end part, which is rotatably supported by the second pivot.

16. The valve control apparatus according to claim 14, wherein:
the follower is made of a magnetic material; and
the magnetic movable body is installed integrally to the rod such that the magnetic movable body overlaps with the follower in an axial direction of the support shaft.

17. The valve control apparatus according to claim 16, wherein:
a moving path of the follower, along which the follower is moved at time of moving the rod in the stroke direction, passes a location, at which the magnetic flux generated by the first and second magnets does not pass through the magnetic sensing surface of the sensor to result in zero as the density of the magnetic flux sensed with the sensor; and
the moving path of the follower along which the follower is moved at time of moving the rod in the stroke direction, passes along an imaginary straight line, which extends in a direction generally perpendicular to the stroke direction of the rod.

18. The valve control apparatus according to claim 1, wherein:
- the sensor includes a sensor chip, which has the magnetic sensing surface and is encapsulated in a package that is configured into a generally flattened rectangular parallelepiped body;
- a size of the package, which is measured in a perpendicular direction that is perpendicular to the magnetic sensing surface, is shorter than a size of the package, which is measured in a direction that is parallel to the magnetic sensing surface; and
- the perpendicular direction of the package is generally perpendicular to the stroke direction of the rod.

19. The valve control apparatus according to claim 1, wherein:
- the sensor includes a sensor chip, which has the magnetic sensing surface and is encapsulated in a package that is configured into a generally flattened rectangular parallelepiped body;
- a size of the package, which is measured in a perpendicular direction that is perpendicular to the magnetic sensing surface, is shorter than a size of the package, which is measured in a direction that is parallel to the magnetic sensing surface; and
- the perpendicular direction of the package is generally parallel to the stroke direction of the rod.

20. The valve control apparatus according to claim 1, wherein an inner peripheral surface of the rod bearing is curved such that an inner diameter of the rod bearing progressively increases from an axial center part of the rod bearing toward each of first and second axial end parts of the rod bearing in the axial direction.

* * * * *